(12) United States Patent
Goldmann et al.

(10) Patent No.: US 8,162,293 B2
(45) Date of Patent: Apr. 24, 2012

(54) DEVICE FOR APPLYING COOLING MIST AND DRY AIR TO INDIVIDUALS

(76) Inventors: Richard Goldmann, Poughkeepsie, NY (US); Russ Weinzimmer, Millford, NH (US); Douglas P. Burum, Acton, MA (US)

( * ) Notice: Subject to any disclaimer, the term of this patent is extended or adjusted under 35 U.S.C. 154(b) by 943 days.

(21) Appl. No.: 11/981,864

(22) Filed: Oct. 31, 2007

(65) Prior Publication Data

US 2009/0108475 A1   Apr. 30, 2009

(51) Int. Cl.
*B01F 3/04* (2006.01)
(52) U.S. Cl. .............. 261/26; 261/28; 261/115
(58) Field of Classification Search ........... 261/26, 261/27, 28, 84, 115, 116, DIG. 3, DIG. 43
See application file for complete search history.

(56) References Cited

U.S. PATENT DOCUMENTS

| | | | |
|---|---|---|---|
| 3,188,007 A | 6/1965 | Myklebust | |
| 3,937,610 A | 2/1976 | Farrell | |
| 3,997,635 A | 12/1976 | Hallgren | |
| 5,222,375 A | 6/1993 | Conrad et al. | |
| 5,497,633 A * | 3/1996 | Jones et al. | 62/314 |
| 5,843,344 A * | 12/1998 | Junkel et al. | 261/28 |
| 6,182,463 B1 * | 2/2001 | Strussion et al. | 62/314 |
| 6,216,961 B1 * | 4/2001 | Utter et al. | 239/153 |
| 6,325,362 B1 * | 12/2001 | Massey et al. | 261/127 |
| 6,471,194 B2 * | 10/2002 | Keeney | 261/30 |
| 6,543,247 B2 * | 4/2003 | Strauss | 62/259.3 |
| 6,675,739 B2 * | 1/2004 | Terrell et al. | 119/448 |
| 7,150,109 B2 | 12/2006 | Knight et al. | |
| 7,180,741 B1 | 2/2007 | Knight et al. | |
| 7,422,163 B1 * | 9/2008 | DeVorss | 239/289 |
| 2003/0064677 A1 * | 4/2003 | Terrell et al. | 454/337 |
| 2003/0188477 A1 * | 10/2003 | Pasternak et al. | 47/17 |
| 2005/0051914 A1 * | 3/2005 | Gordon et al. | 261/79.2 |

FOREIGN PATENT DOCUMENTS

| | | |
|---|---|---|
| CA | 2406110 AA | 11/2001 |
| EP | 0389190 A3 | 3/1991 |
| JP | 08105026 A2 | 4/1996 |
| JP | 08327092 A2 | 12/1996 |
| JP | 2002051657 A2 | 2/2002 |

* cited by examiner

*Primary Examiner* — Charles Bushey
(74) *Attorney, Agent, or Firm* — Russ Weinzimmer; Russ Weinzimmer & Associates PC

(57) ABSTRACT

An apparatus and method are disclosed for cooling one or more exercising or resting individuals by applying a water mist and dry air. The apparatus can be free standing, fixed to the walls or ceiling, or attached to an object on which an individual is resting or exercising. The mist and dry air can be applied together or separately, simultaneously or alternately, with varying timing and intensity. In some embodiments, the mist and dry air are manually controlled or operate according to the passage of time. In other embodiments the need for cooling is determined by one or more physiological parameters measured by sensors directed toward or attached to an individual, or embedded in an object on which an individual is resting or exercising. Still other embodiments estimate the heating of the individual by measuring the amount of work performed or the rate of energy expenditure.

24 Claims, 23 Drawing Sheets

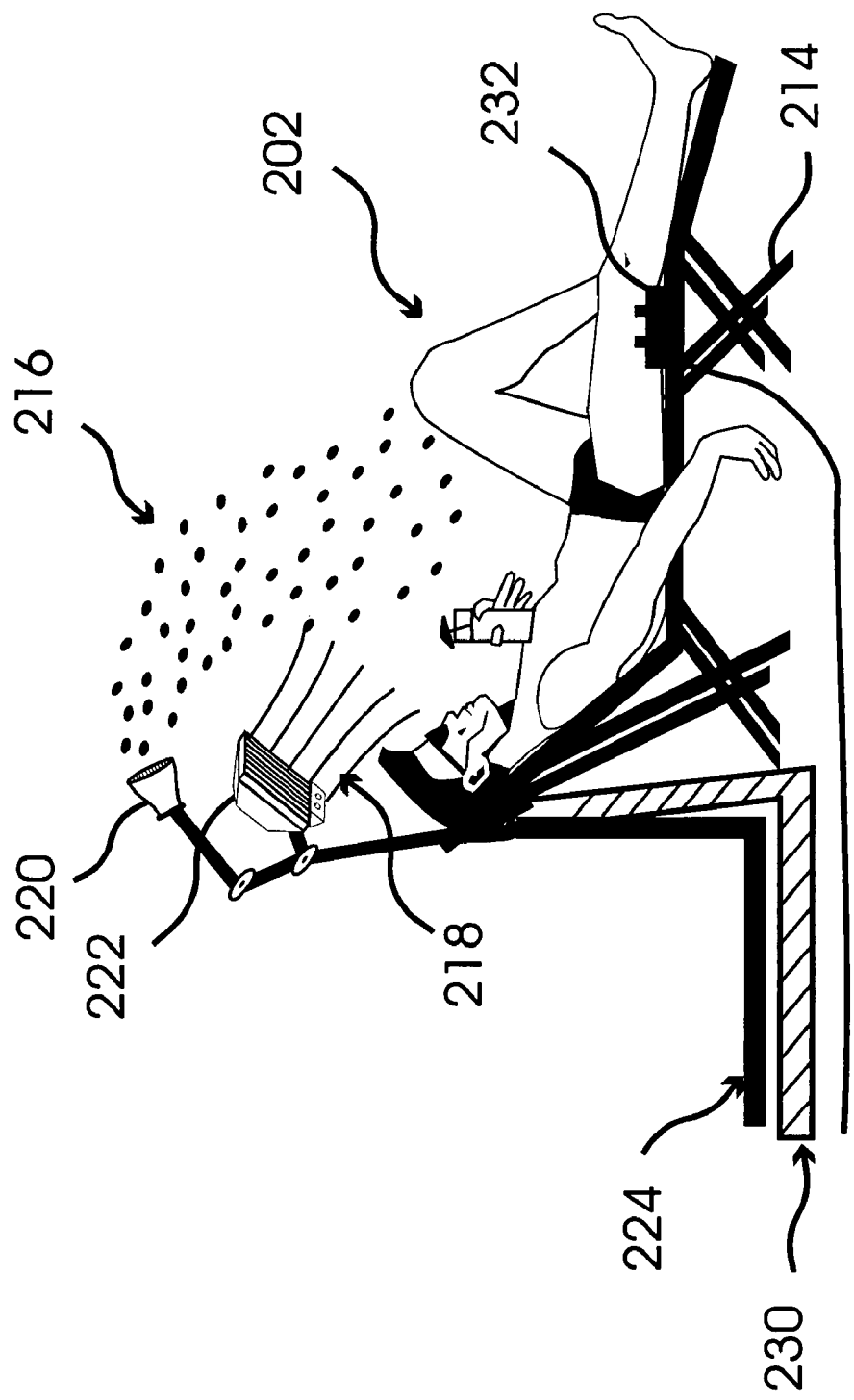

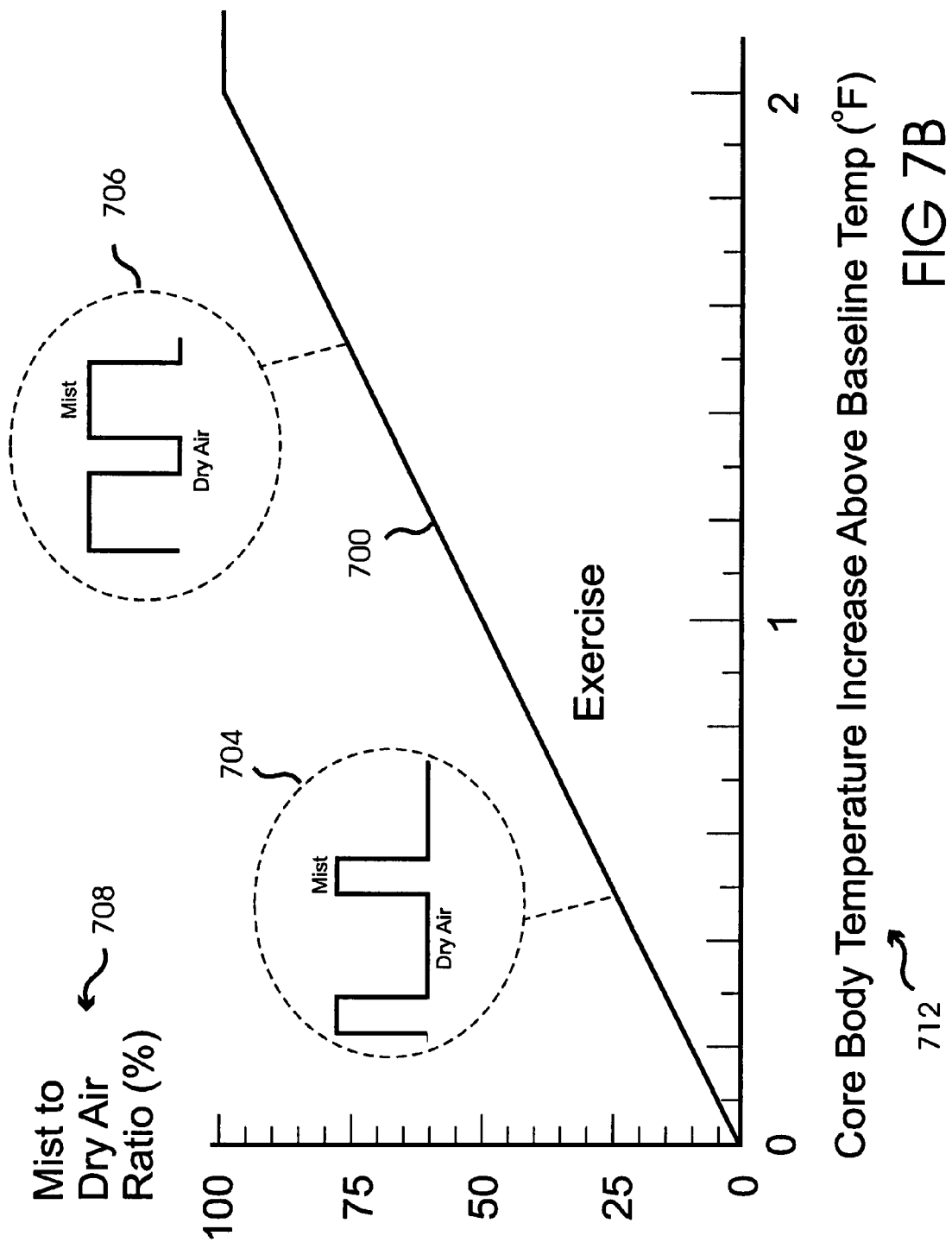

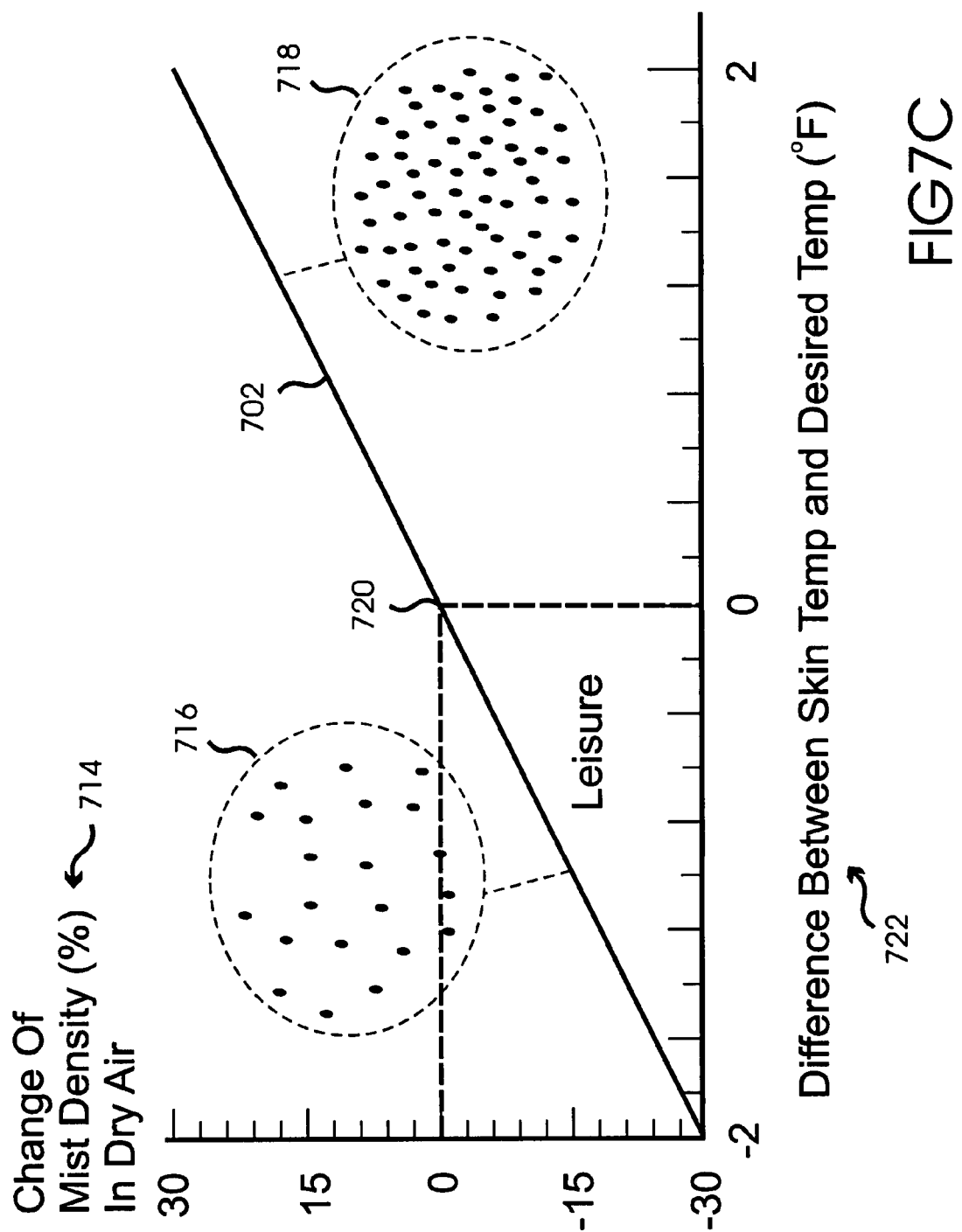

DEVICE FOR APPLYING COOLING MIST AND DRY AIR TO INDIVIDUALS

FIELD OF THE INVENTION

The invention generally relates to devices and methods for cooling individuals, and more specifically to evaporative cooling of individuals.

BACKGROUND OF THE INVENTION

There are many circumstances wherein individuals can become overheated. Vigorous exercise is a clear example, as well as leisure activities under conditions of high temperatures and/or intense sunlight. Active and effective cooling of individuals under these circumstances can protect their health and significantly increase their comfort and enjoyment.

Evaporative cooling is well known as a highly effective means for cooling individuals. Indeed, it is the mechanism by which the body cools itself through perspiration. The discomfort and potential dehydration of cooling by perspiration can be avoided through the application of a mist of water to an individual, which cools the body in essentially the same manner as perspiration, and can be even more effective than perspiration since the mist impacts the skin at a temperature significantly below body temperature, and hence absorbs more heat than an equivalent quantity of perspiration.

Means for generating and applying a water mist to one or more individuals are well known. However, misting does not always provide sufficient cooling efficiency, due to limited evaporation rates. Also, misting can lead to wetness if the evaporation rate is not sufficient.

SUMMARY OF THE INVENTION

An apparatus and method are disclosed for cooling at least one individual with water droplets and dry air. The apparatus combines a device for applying water droplets to one or more individuals with a means for applying dry air so as to increase the rate of evaporation, thereby increasing the cooling efficiency, and reducing the tendency for water to accumulate.

In preferred embodiments, the water droplets are in the form of a mist, a spray, or a shower. In some preferred embodiments, the apparatus is attached to an object on which an individual is resting or exercising.

In further preferred embodiments, the apparatus is able to direct a flow of dry air onto an individual, and in various preferred embodiments the apparatus is able to control the direction and/or speed of the dry air, inject water droplets into the flow of dry air, continue to apply dry air while intermittently applying droplets, and/or alternate between applying dry air and droplets.

In preferred embodiments, the apparatus is free standing, is built into a wall or ceiling, or is part of the climate control system for an entire room. Depending on the preferred embodiment, the device for applying water droplets controls one or more of the duration of emitting of water droplets, frequency of emitting of water droplets, numerical density of emitted water droplets, size of emitted water droplets, temperature of emitted water droplets, direction of travel of emitted water droplets, speed of travel of emitted water droplets, and rate of divergence of emitted water droplets.

In some preferred embodiments, the apparatus is manually controlled, while in other preferred embodiments the apparatus is automatically controlled. In some of the latter preferred embodiments, the apparatus is controlled according to the passing of time and/or according to one or more measured physiological parameters such as the skin temperature, core body temperature, heart rate, and rate of perspiration. Physiological parameters can be measured by sensors attached to or directed toward an individual or sensors embedded in an object or device on which an individual is resting or exercising. In other preferred embodiments the apparatus is automatically controlled at least partly according to the amount of activity and/or the amount of energy exerted on an exercise machine.

Some preferred embodiments also include an airborne droplet detection device and limit the application of mist so as to avoid an undesirable amount of airborne droplets.

The method of the invention includes applying water droplets to an individual in coordination with providing dry air at least near the individual, so as to promote the evaporation of the water droplets. Preferred embodiments of the method include providing an apparatus as described above and applying dry air as a directed flow onto the individual.

Another aspect of the method includes applying water droplets to an individual in an enclosed environment containing dry air, so as to take advantage of dry air properties that enhance evaporation of water droplets and thereby increase evaporative cooling efficiency.

BRIEF DESCRIPTION OF THE DRAWINGS

FIG. 2C is similar to FIG. 2B, except that the dry air is externally supplied, and the device is manually controlled;

FIG. 7B is a graphical presentation of a mist control strategy for an exercising individual in a preferred embodiment wherein the water droplets are applied intermittently and a sensor is used to measure the deviation of the core body temperature of the individual away from a baseline temperature;

FIG. 7C is a graphical presentation of a mist control strategy for a resting individual in a preferred embodiment wherein the intensity of water droplets is varied until the cooling effect of the water droplets is sufficient to maintain a desired skin temperature;

DETAILED DESCRIPTION OF PREFERRED EMBODIMENTS

Figure 1A:
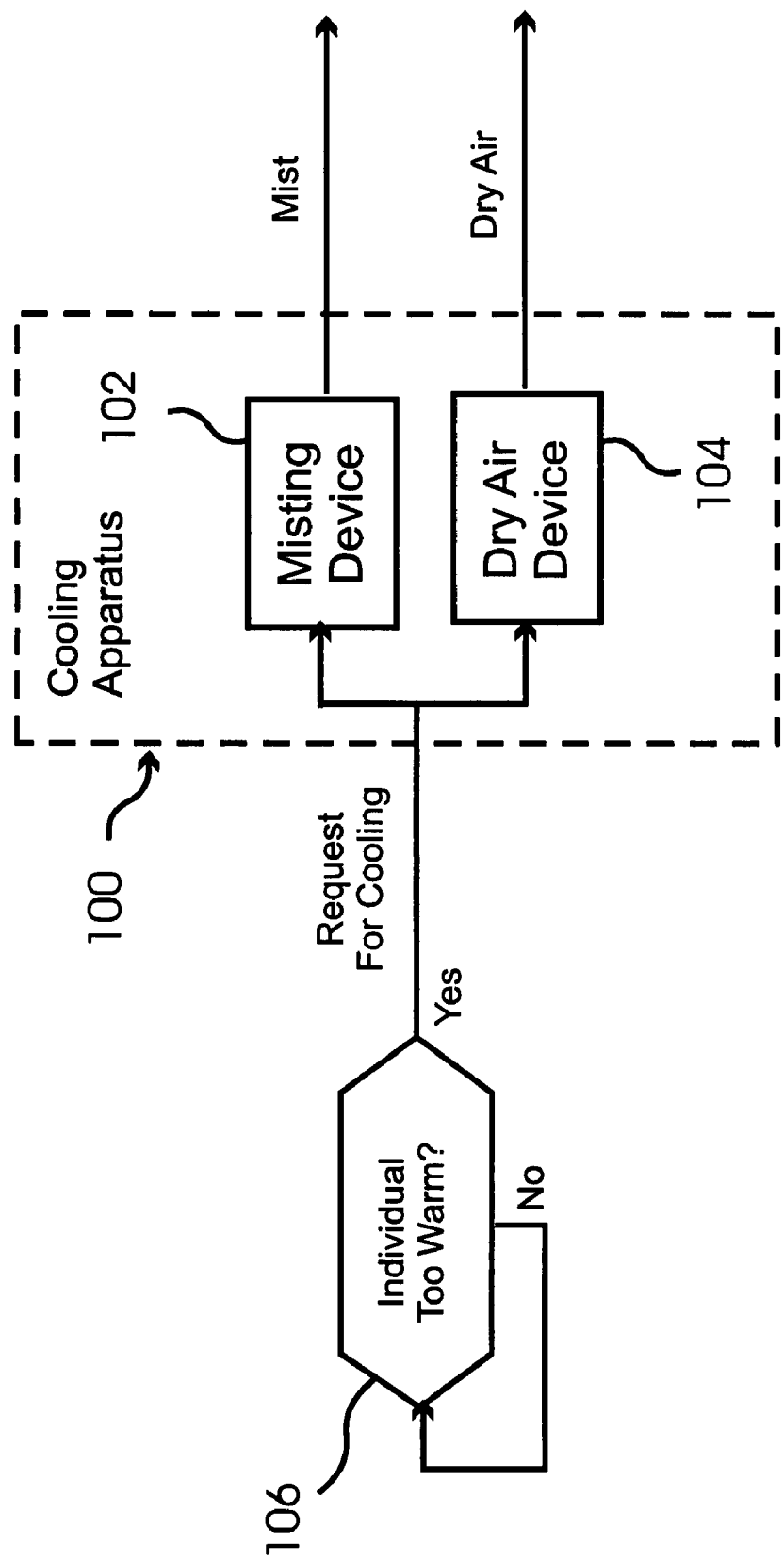
FIG. 1A is a block diagram of a general embodiment of the invention.

With reference to FIG. 1A, the basic invention is a cooling apparatus 100 that includes a water droplet application device 102, and a dry air application device 104. If an individual is too warm 106, cooling is requested, either due to direct adjustment of a manual control or due to an automatically generated signal according to the passage of time and/or according to one or more measured physiological parameters. The apparatus of the invention 100 responds by applying mist 102 and dry air 104 to the individual.

Figure 1B:
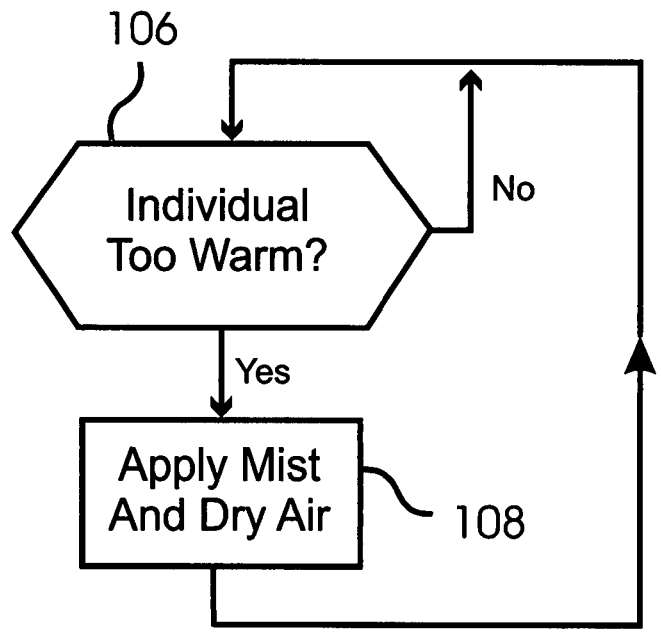
FIG. 1B is a functional diagram of a preferred embodiment wherein mist and dry air are applied simultaneously at a fixed ratio.
Figure 1C:
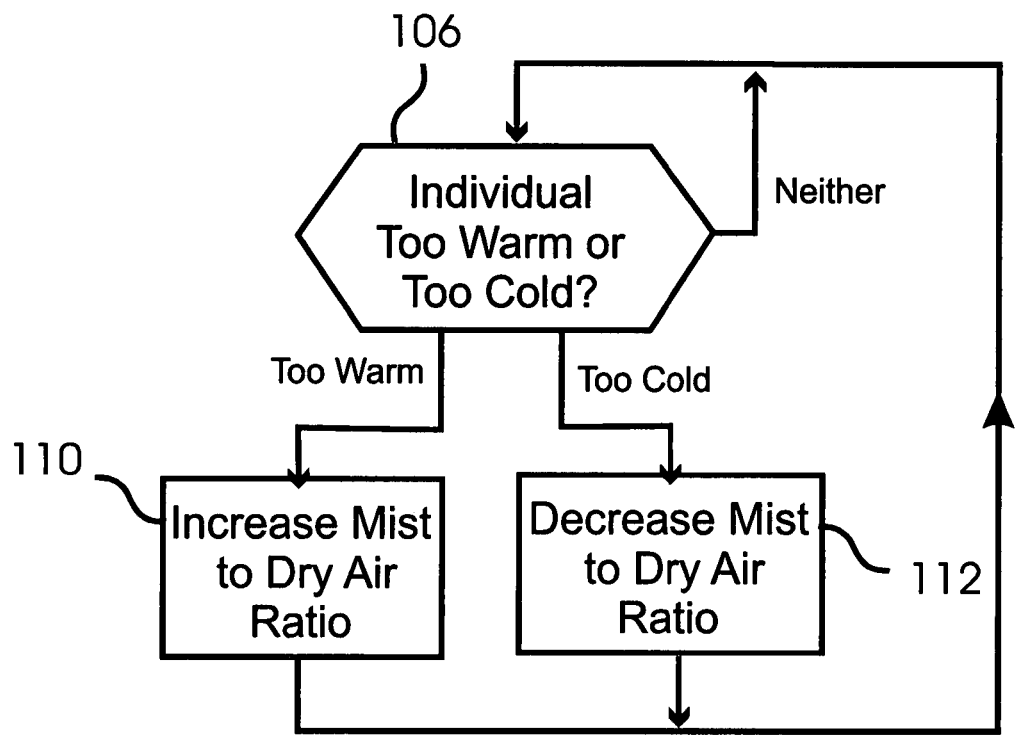
FIG. 1C is a functional diagram of a preferred embodiment wherein mist and dry are applied simultaneously with a variable ratio.
Figure 1D:
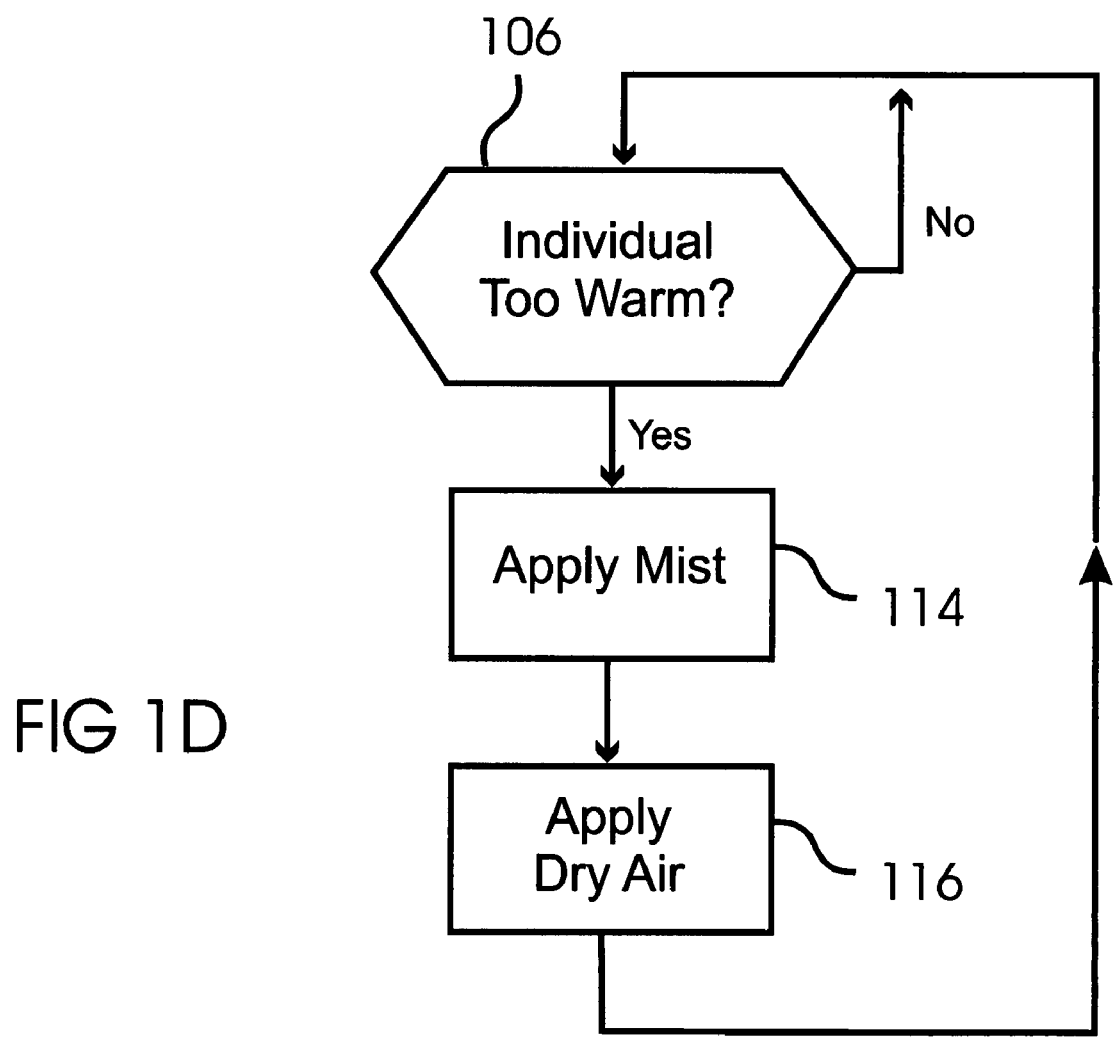
FIG. 1D is a functional diagram of a preferred embodiment wherein mist is applied separately, followed by dry air.
Figure 1E:
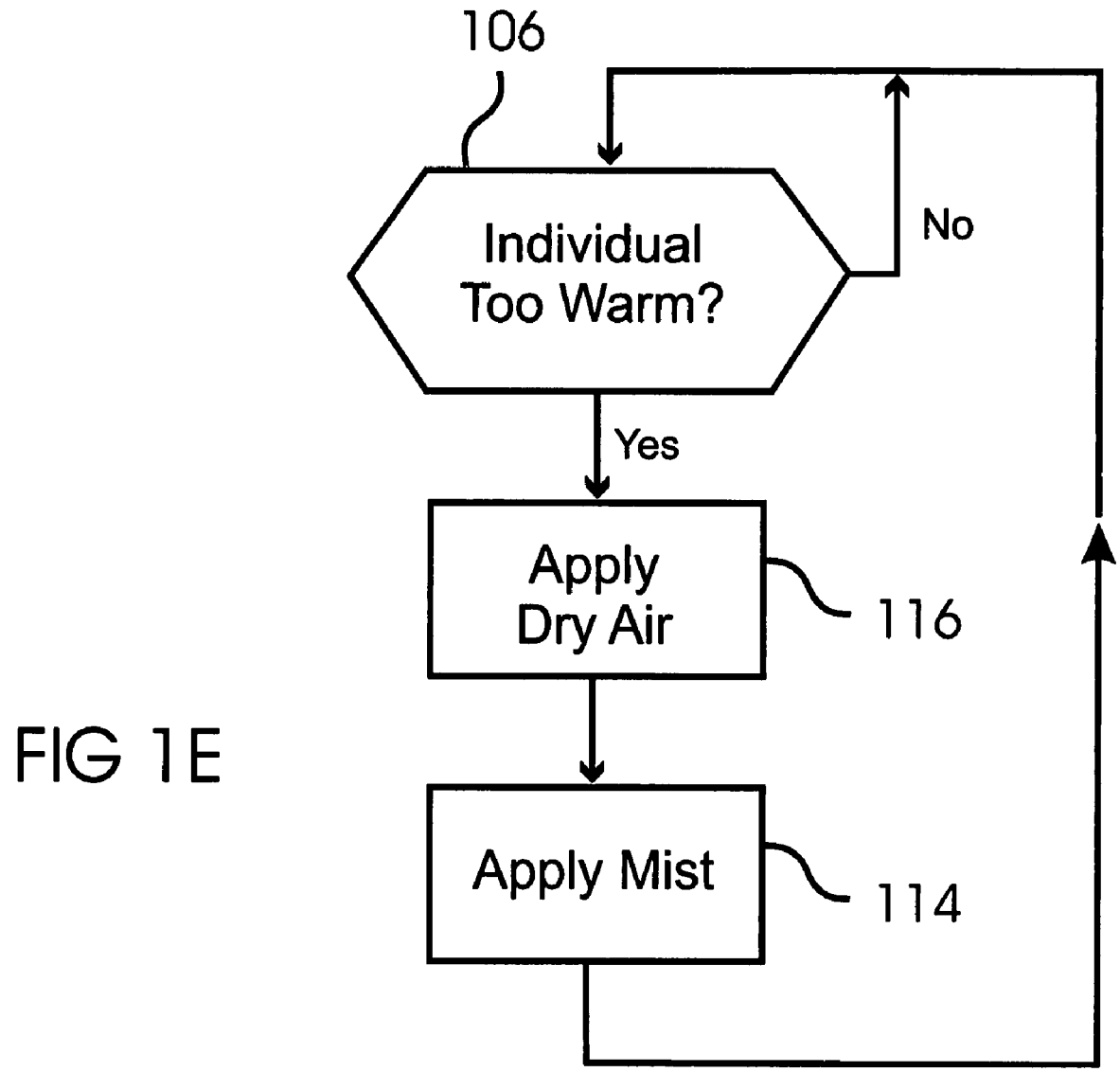
FIG. 1E is a functional diagram of a preferred embodiment wherein dry air is applied separately, followed by mist.
Figure 1F:
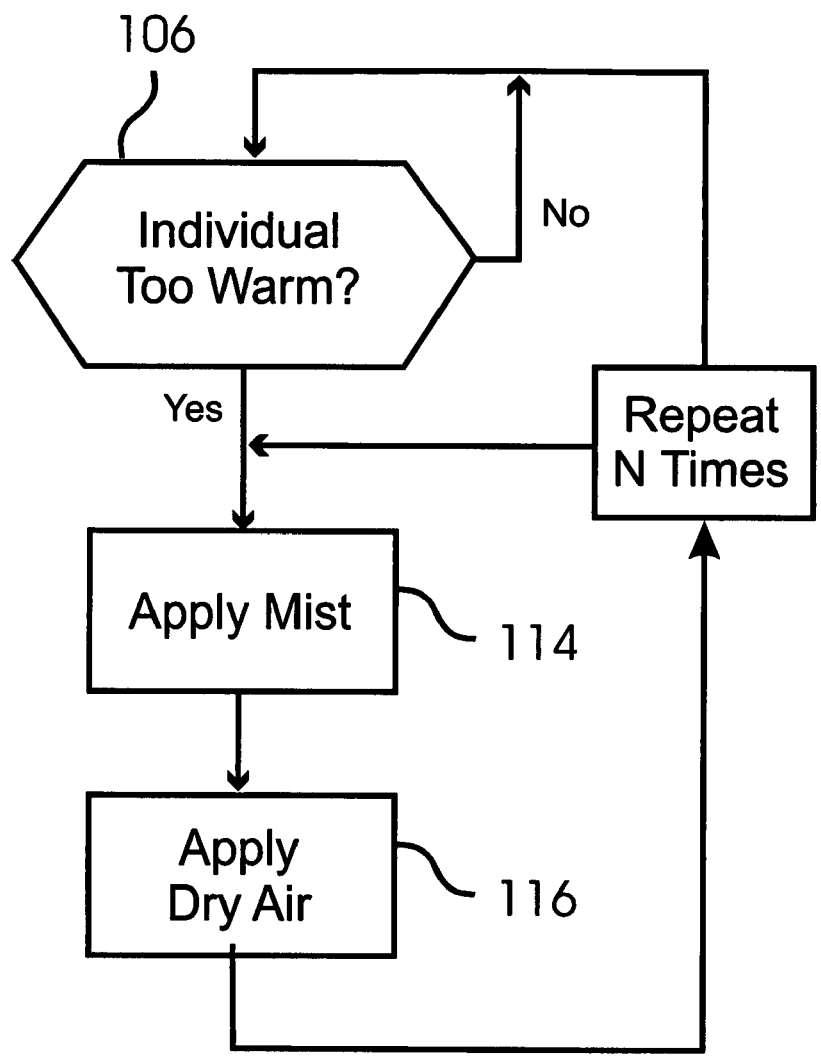
FIG. 1F is a functional diagram of a preferred embodiment wherein multiple bursts of mist and dry air are applied alternately.
Figure 1G:
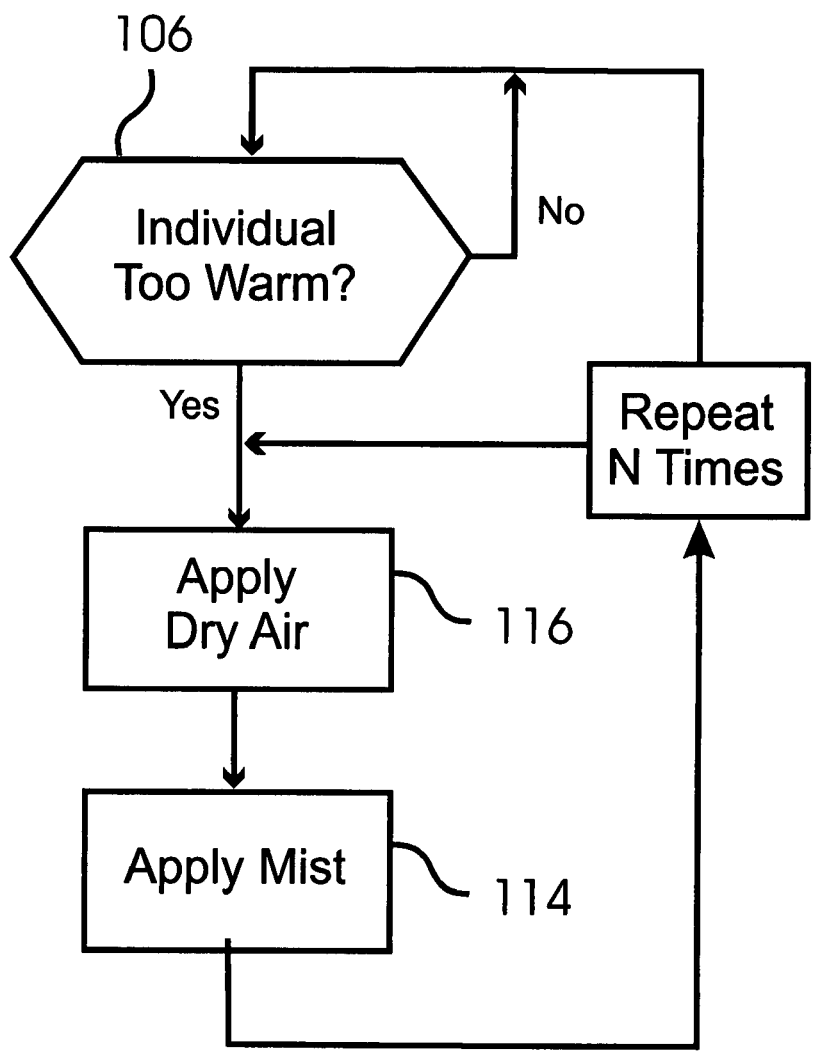
FIG. 1G is a functional diagram of a preferred embodiment wherein multiple bursts of dry air and mist are applied alternately.

FIG. 1B through FIG. 1F illustrate different strategies for applying mist and dry air for cooling an individual. In FIG. 1B, mist and dry air are applied simultaneously with fixed relative amounts 108 whenever the individual is too warm, and the application of mist and dry air 108 is halted when the individual is no longer too warm. In FIG. 1C, the ratio of mist to dry air is increased 110 if the individual is too warm, and decreased 112 if the individual is too cold. In FIG. 1D, if the individual is too warm mist is applied separately 114, and then dry air is applied 116, while in FIG. 1E dry air is applied first 116, followed by mist 115. FIG. 1F is the same as FIG. 1D, and FIG. 1G is the same as FIG. 1E, except that the alternate application of mist 114 and dry air 116 is repeated multiple times.

Figure 2A:
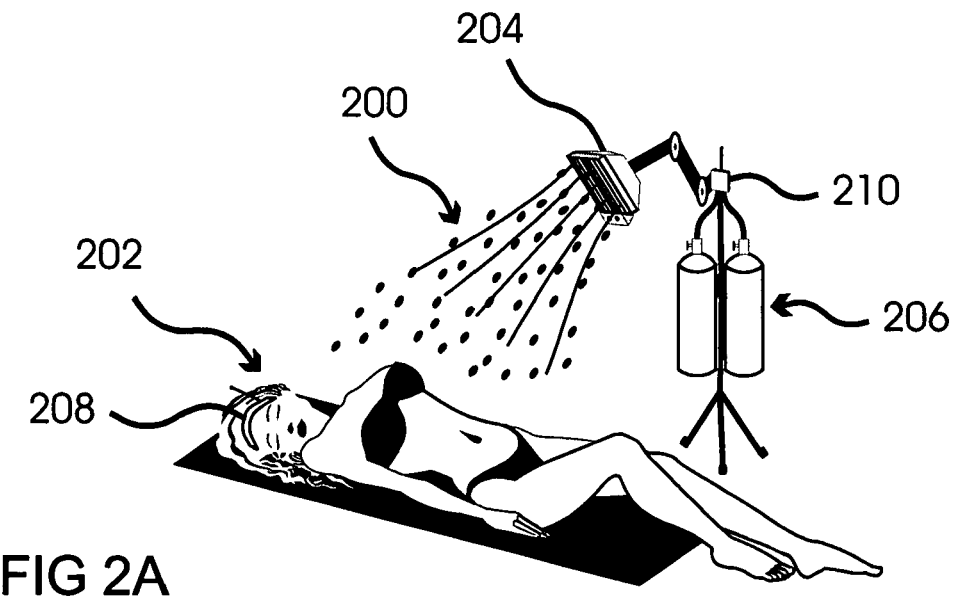
FIG. 2A is a perspective drawing of a reclining individual being cooled by a free standing, self-contained embodiment of the invention that uses a skin temperature sensor attached to the individual to detect the need for cooling, and applies dry air mixed with mist.

FIG. 2A is a perspective view of a preferred embodiment wherein cooling mist and dry air 200 are applied simultaneously and in a fixed ratio to an individual 202 lying down in a restful position. The mist and dry air application device 204 is supported by a free-standing base that includes containers of water and compressed dry air 206. The need for cooling is determined at least partly according to the skin temperature of the individual 202 as measured by a sensor 208, which in FIG. 2A is a thermocouple attached to the forehead of the individual 202. The sensor 208 communicates with a mist and dry air controller 210 by transmitting wireless signals to the controller 210.

In order to avoid false readings, whenever possible skin temperatures and core body temperatures are measured at locations that are not directly cooled by mist and dry air. For example, the head band in FIG. 2A is placed at a location where the sensor is not directly cooled by the mist. In addition, the headband is made from a water repellent material containing thermal insulation so as to further isolate the sensor from the mist, and so as to prevent any evaporative cooling of the skin region where the sensor is attached, including evaporative cooling by perspiration. In other embodiments, a tympanic membrane temperature sensor can be used, since the tympanic membrane will not be significantly cooled by the mist. In still other embodiments, the skin temperature of the individual 202 is measured by a sensor, such as an infrared sensor, that is directed toward but not directly attached to the individual 202.

Figure 2B:
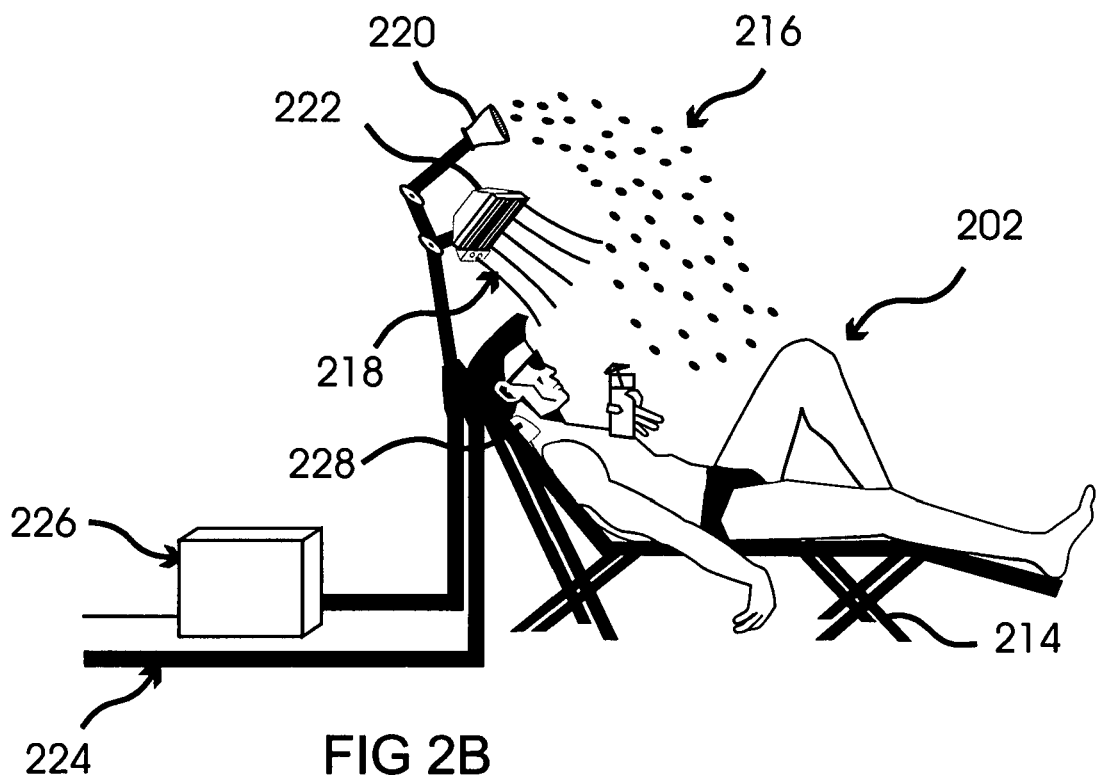
FIG. 2B is a perspective drawing of an individual sitting on a lounge chair being cooled by an embodiment of the invention that includes an air drying apparatus and is externally supplied with water, uses a core body temperature sensor attached to the chair to determine the need for cooling, and applies separate streams of dry air and mist.

FIG. 2B is a perspective view of a preferred embodiment that is similar to the embodiment of FIG. 2A, except that the individual 202 is resting on a reclining chair 214 and the mist 216 and dry air 218 are applied by separate devices 220, 222 that are separately controlled. Water for the mist 224 is supplied by an external source of water (not shown), and dry air is provided by an air drying apparatus 226 supplied by a source of electrical power (not shown). The need for cooling is determined at least partly according to the core body temperature of the individual 202 as derived from measurements made by a sensor 228 embedded in the back of the chair such that it rests against the neck of the individual 202.

FIG. 2C is a perspective view of an embodiment similar to the embodiment of FIG. 2B, except that the dry air is supplied by an external dry air source 230, and the cooling is controlled by the individual 202 through a manual control unit 232 attached at a convenient location to an arm of the recliner 214.

Figure 3A:
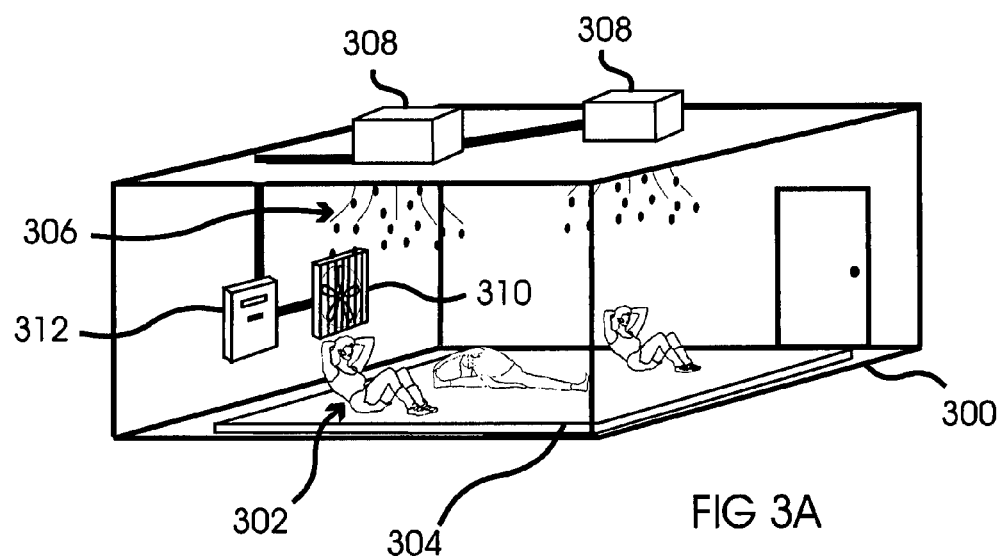
FIG. 3A is a perspective drawing of an embodiment wherein a plurality of individuals exercising in a room is cooled by mist from the ceiling and dry air from an air duct on the wall.

FIG. 3A is a perspective view of an exercise room 300 in which a group of individuals 302 is exercising on a mat 304 while being cooled by mist 306 emitted by water droplet application devices 308 mounted in the ceiling of the room 300 and dry air 310 emitted from a duct in the wall of the room 300. The mist 308 and the dry air 310 are separately controlled by a manually settable controller 312 mounted on the wall.

Figure 3B:
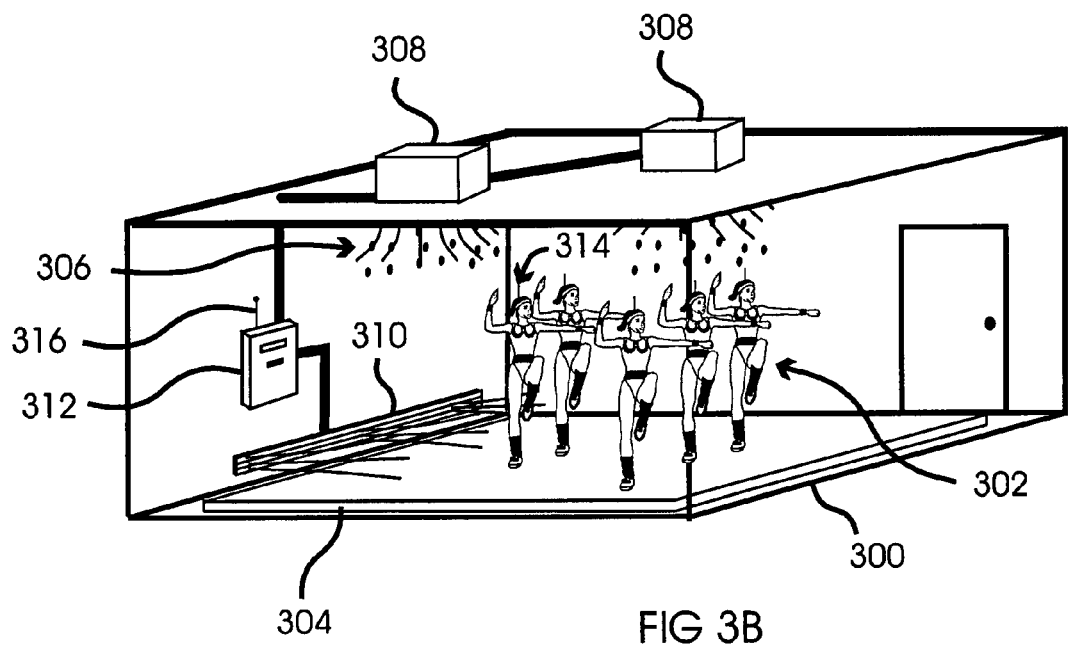
FIG. 3B is a perspective drawing of an embodiment wherein a plurality of individuals exercising in a room is cooled by mist from the ceiling and a flow of dry air near the floor, while the need for cooling is monitored by skin temperature sensors attached to the foreheads of the individuals.

FIG. 3B is a perspective view of an embodiment similar to the embodiment of FIG. 3A, except that the controller 312 operates at least partly according to core body temperature measurements from sensors 314, such as infrared temporal artery sensors, attached to the foreheads of the individuals 302 and transmitted wirelessly to an antenna 316 on the control unit. Also, in this embodiment the source of dry air 310 directs a flow of dry air onto the mat 304, so as to prevent the mat 304 from becoming slippery due to water accumulation.

Figure 4A:
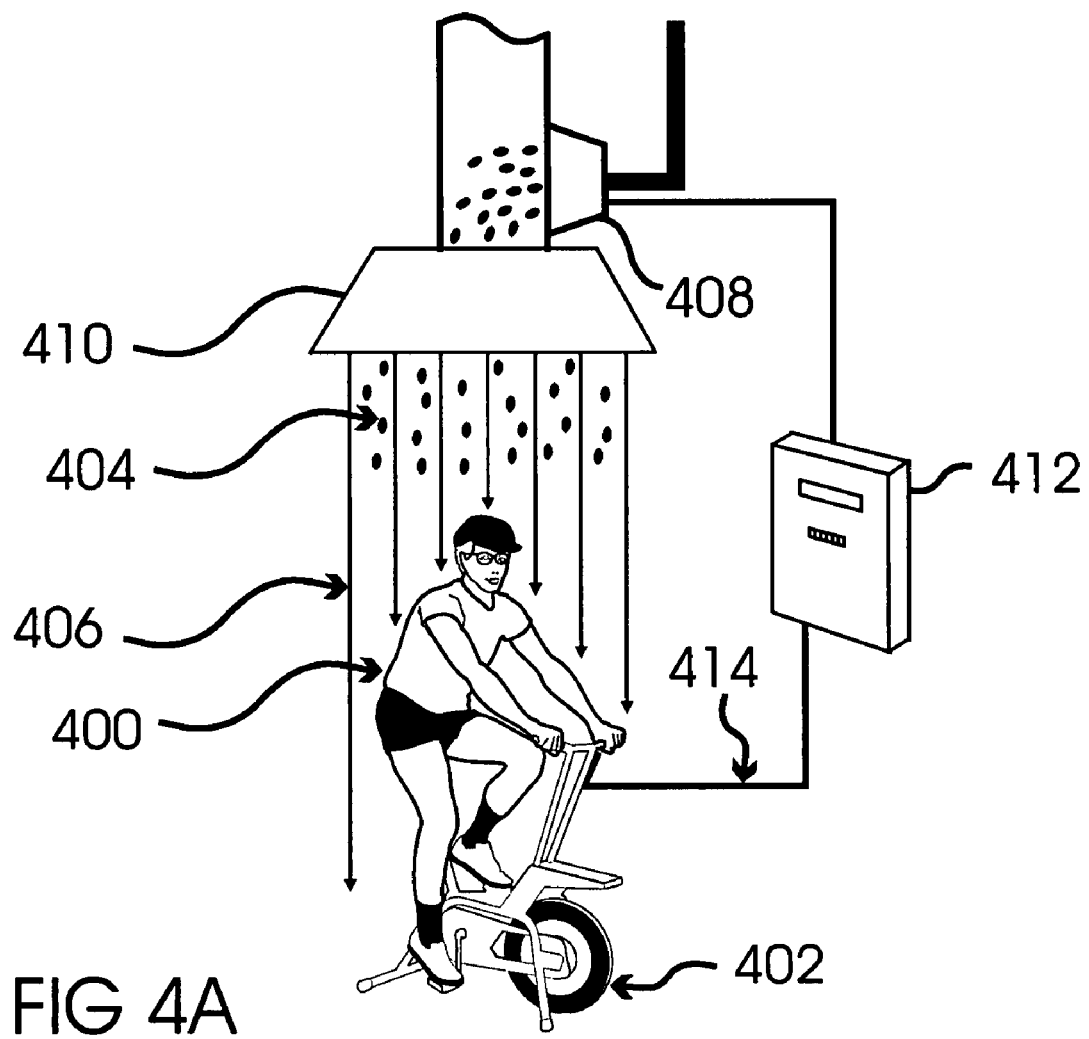
FIG. 4A is a perspective drawing of an individual exercising on a stationary exercise device being cooled by a combined flow of mist and dry air from above, while the individual's heartbeat as measured by a sensor in a hand grip of the device is used to determine the need for cooling.

FIG. 4A is a perspective view of an individual 400 exercising on an exercise device 402 while being cooled by a combined flow of water droplets 404 and dry air 406. A water droplet emission device 408 injects water droplets into a stream of dry air from a dry air source 410. The control unit 412 operates according to the pulse rate of the individual 400 as measured by a sensor embedded in a handle of the exercise device 402 and transmitted to the control unit 412 by a wire 414.

Figure 4B:
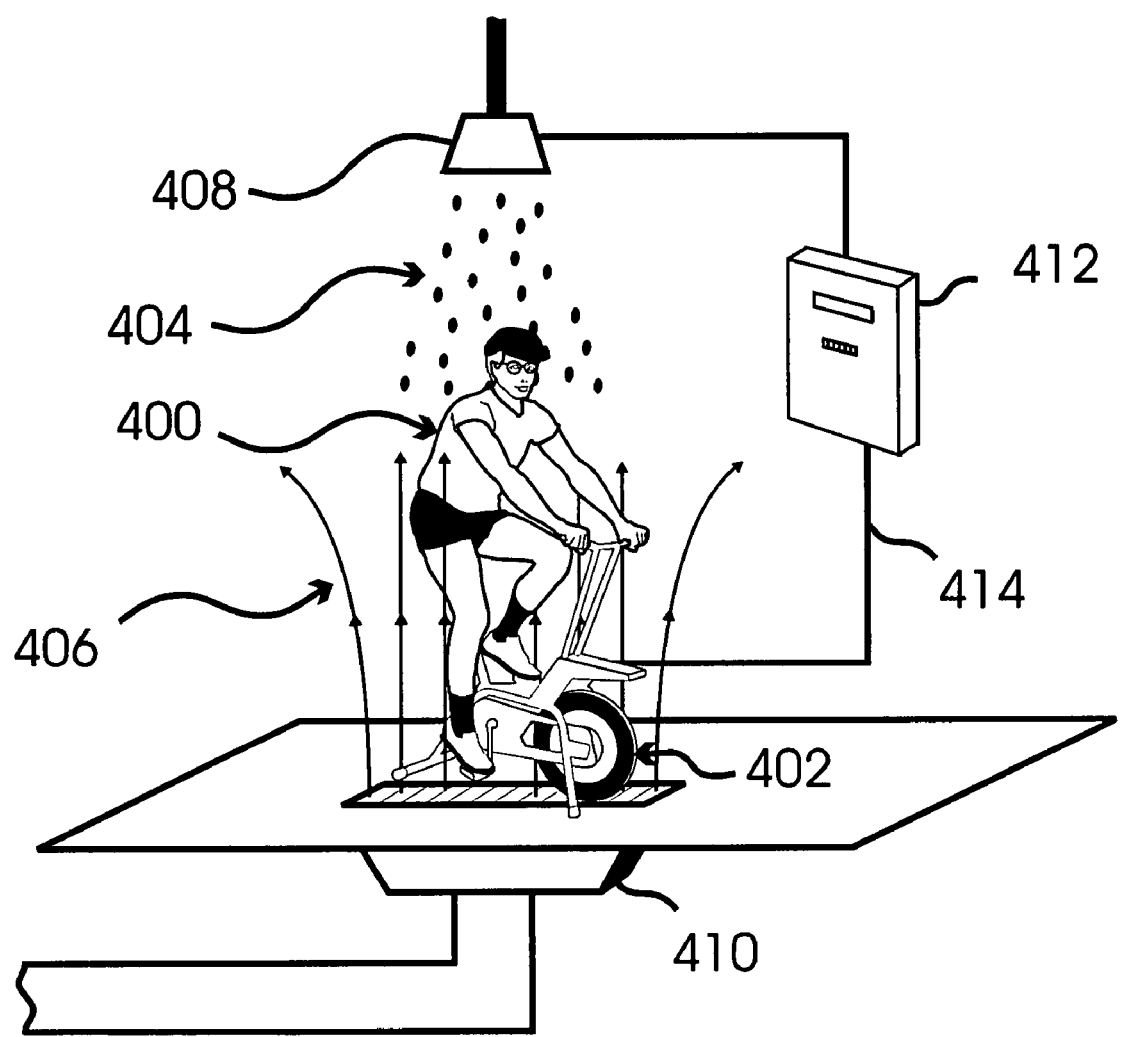
FIG. 4B is a perspective drawing of an individual on a stationary exercise device being cooled by a flow of water droplets from above and a flow of dry air from below.
Figure 4C:
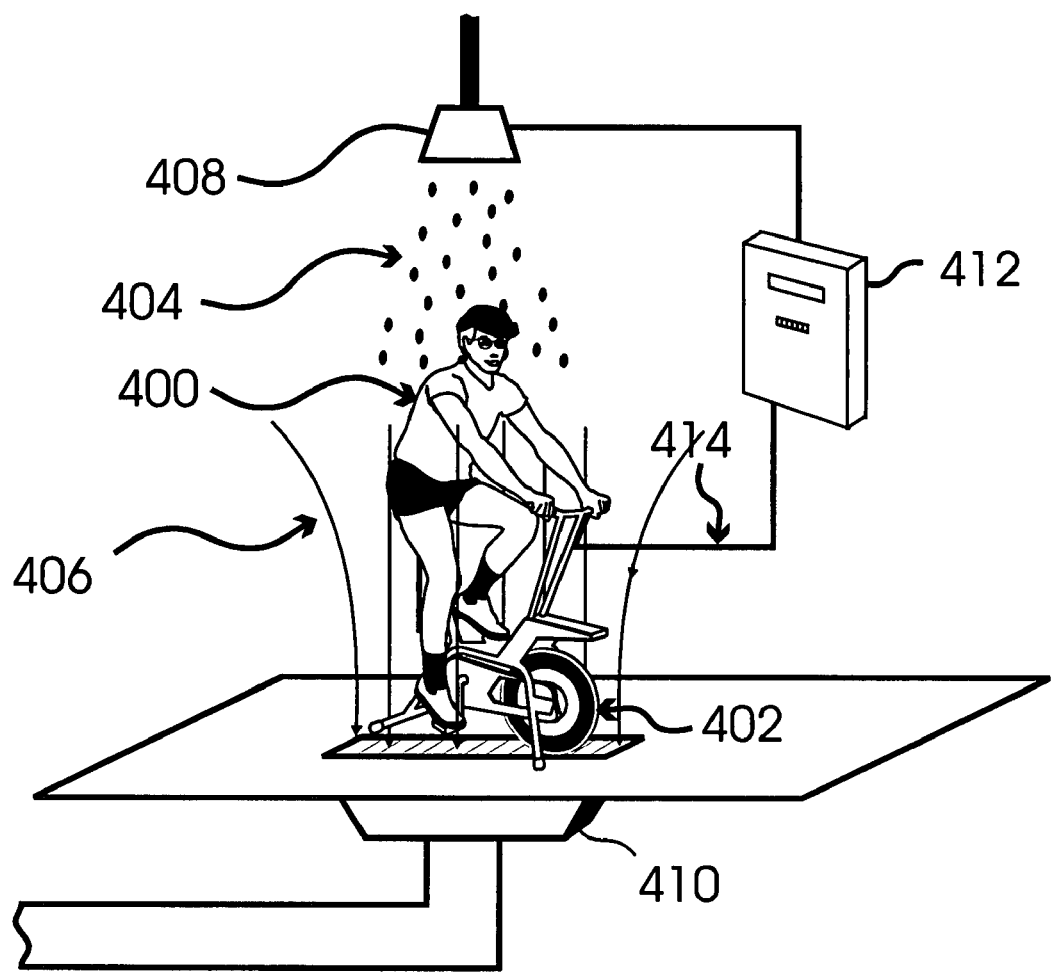
FIG. 4C is a perspective drawing of an individual on a stationary exercise device being cooled by a flow of water droplets from above and a flow of dry air past the individual from the room into a vent below the exercise device.

FIG. 4B and FIG. 4C are perspective views of preferred embodiments similar to the embodiment of FIG. 4A, except that the water droplets 404 are not injected into the flow of dry air 406. Instead, in FIG. 4B the droplets 404 are applied from above the individual 400 while the flow of dry air 406 is applied from below, while in FIG. 4C the droplets 404 are applied from above the individual 400 while dry air 406 flows past the individual and into a vent 410 in the floor below the individual. In the embodiment of FIG. 4C, the ambient air in the room 406 is dry, either due to the local climate or due to drying of the air in the room by de-humidification or air conditioning means. Drawing of the air into a vent 410 in the floor therefore ensures that the individual 400 is always surrounded by and in contact with dry air 406.

Figure 4D:
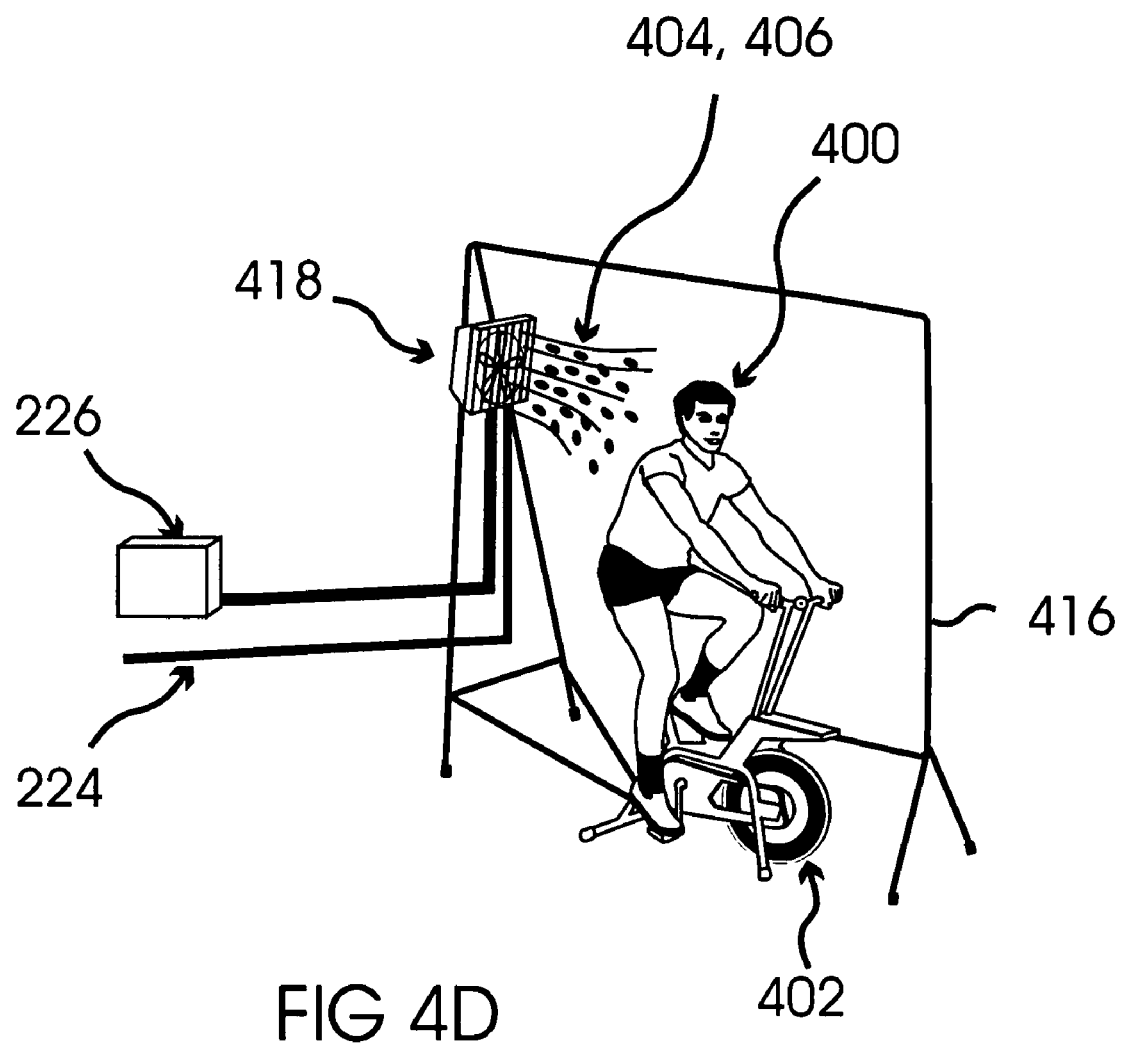
FIG. 4D is a perspective drawing of an individual on a stationary exercise device being cooled by a flow of water droplets from behind emitted by a water droplet emission device attached to the exercise device.

FIG. 4D is a perspective view of a preferred embodiment in which a frame 416 is used to attach the apparatus of the invention to an exercise device 402. In this embodiment, a mixture of water droplets 404 and dry air 406 is applied to the individual 400 from behind by a manually controlled device 418 supplied by an external source of water 224 and an air drying apparatus 226 supplied with electrical energy from an external source (not shown).

Figure 5:
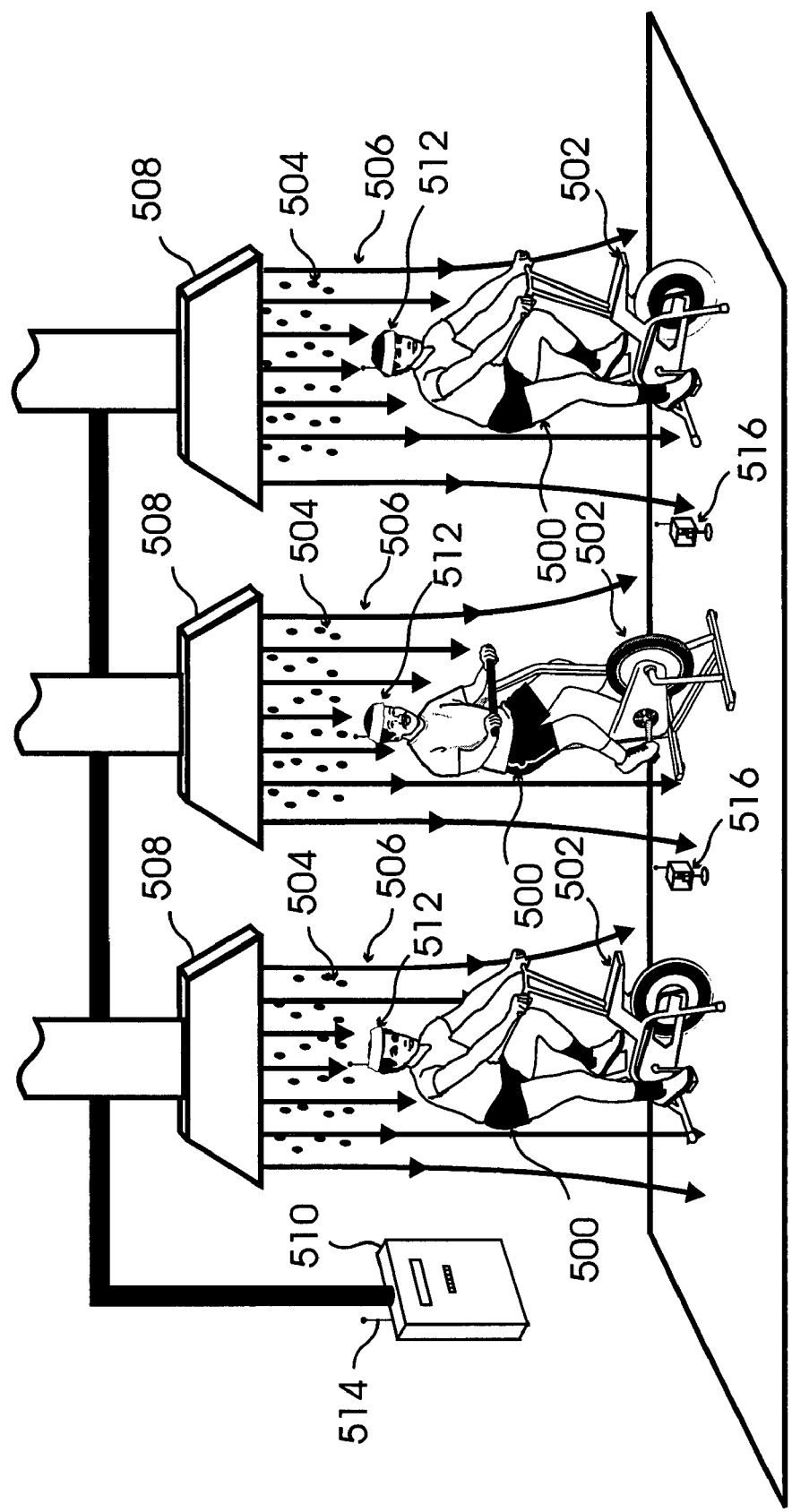
FIG. 5 is a perspective drawing of a plurality of individuals on exercise devices, each being cooled from above by a separate source of water droplets combined with dry air.

FIG. 5 is a perspective view of a preferred embodiment in which a plurality of individuals 500 using a plurality of exercise devices 502 are cooled by a combined flow of mist 504 and dry air 506 emitted by water droplet and dry air application devices 508 positioned above the exercise devices 502. The water droplet and dry air application devices 508 are controlled by a single control unit 510. The need for cooling is determined at least partly according to skin temperature measurements transmitted wirelessly from sensors 512 attached to the individuals 500 and received by an antenna 514 attached to the control unit 510.

In preferred embodiments, the control unit 510 can operate according to average skin temperature measurements obtained from the plurality of individuals 500, or they can separately control the misting and the application of dry air to each of the individuals 500. In addition, airborne water droplet sensors 516 measure the density of water droplets in the air near the ground, and transmit this information wirelessly to the antenna 514 on the controller 510. This information is used to limit the application of water droplets and increase the application of dry air, thereby preventing an excess density of water droplets in the air near the floor.

Figure 6A:
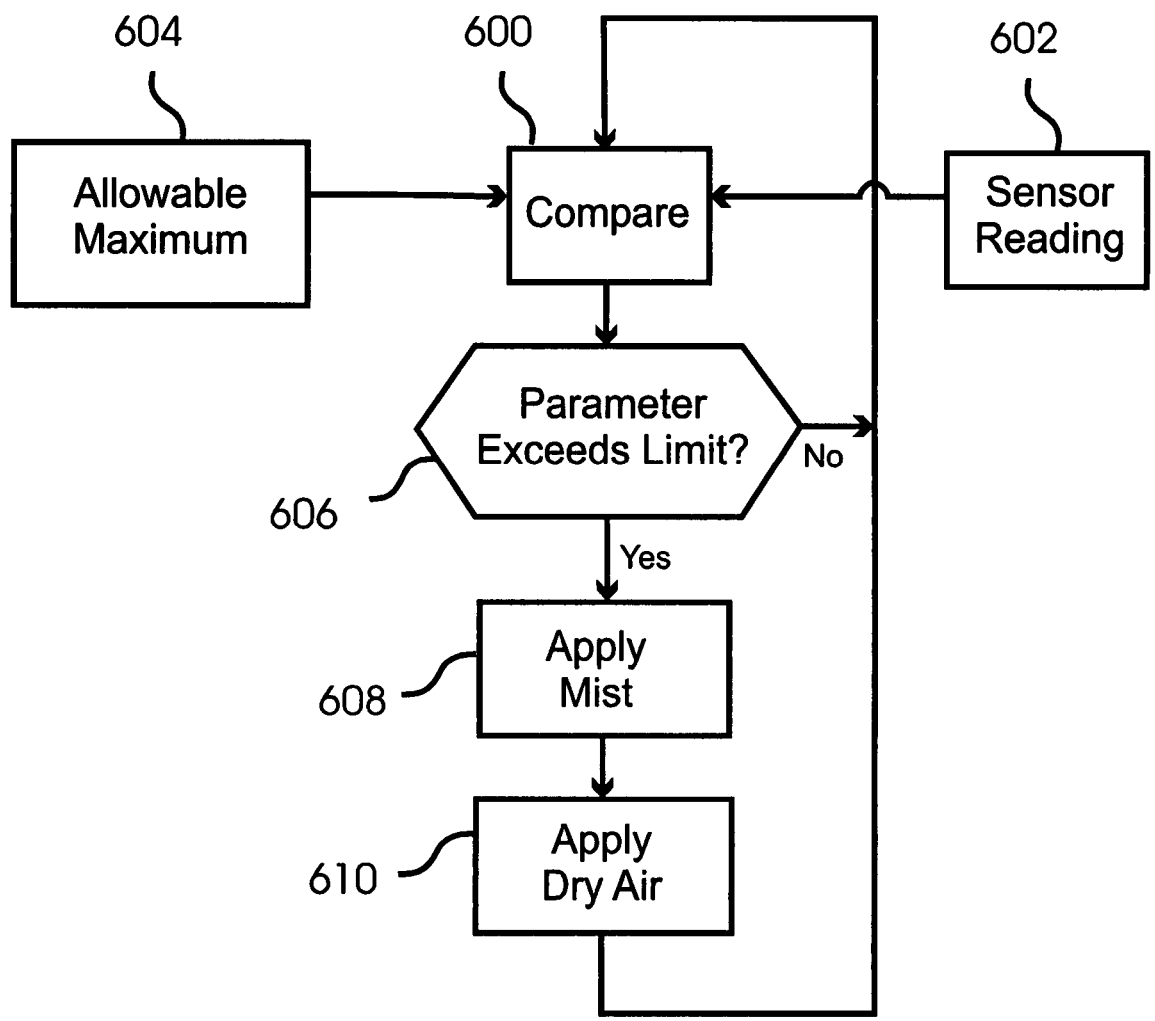
FIG. 6A is a logic diagram that depicts cooling with mist followed by dry air where the need for cooling is determined by a sensor that measures a physiological parameter.
Figure 6B:
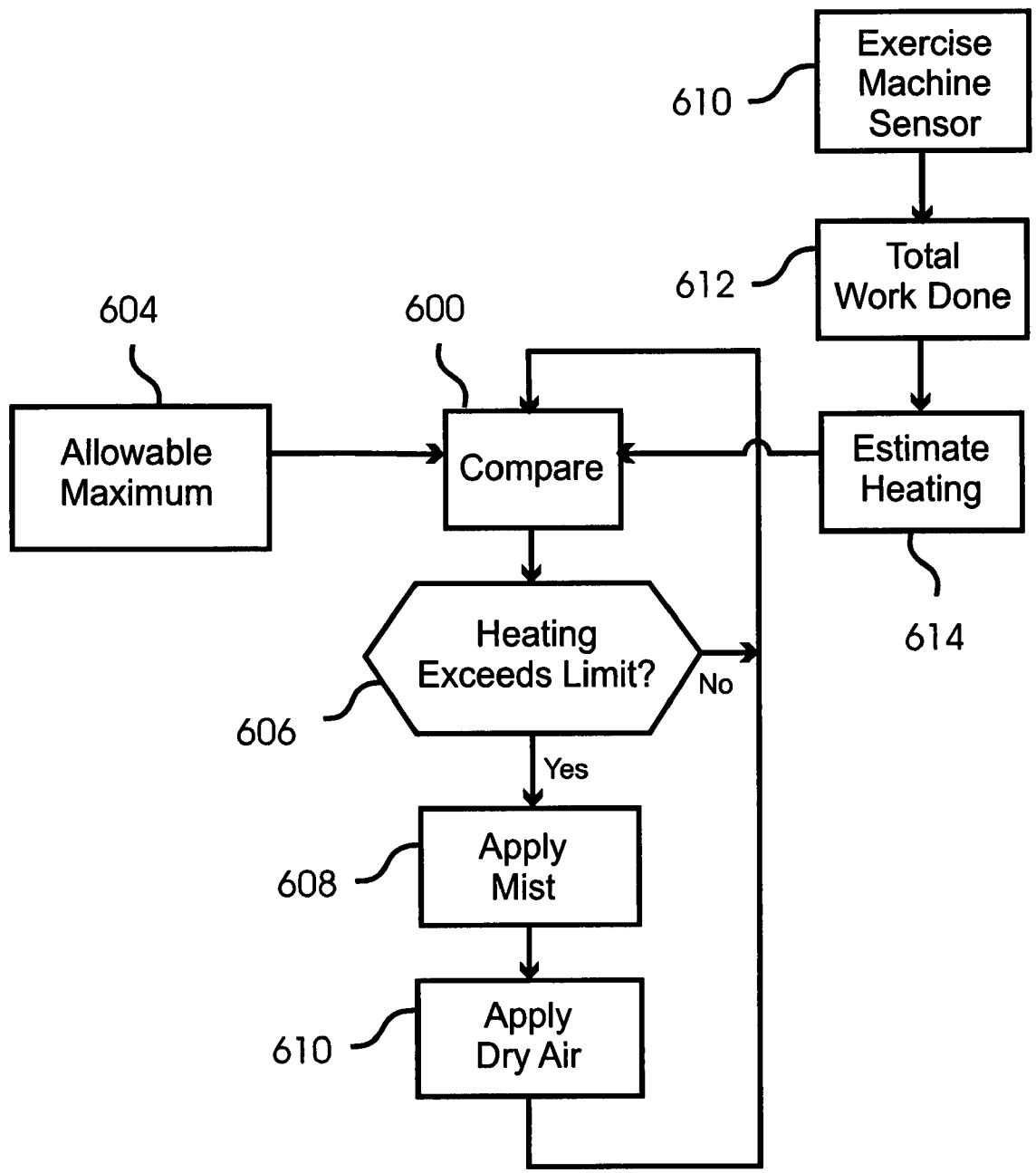
FIG. 6B is a logic diagram that depicts cooling with mist followed by dry air where the need for cooling is estimated according to the amount of work done on an exercise machine.

FIG. 6A and FIG. 6B are logic diagrams that depict strategies for determining the need for cooling an individual. In FIG. 6A, a comparison 600 is made between a sensor reading 602 and an allowable maximum sensor reading 604, where in various embodiments the sensor reading 602 is a measurement of a physiological parameter such as skin temperature, core body temperature, or pulse rate. If the allowable maximum sensor reading is exceeded 606, mist is applied 608, followed by dry air 610. In similar embodiments, other cooling strategies, such as those shown in FIG. 1B through 1G, are used. For example, mist and dry air are applied simultaneously, dry air is applied followed by mist, or mist and dry air are applied simultaneously and continuously but the total intensity and/or the relative amounts of mist and dry air are varied.

In FIG. 6B, a sensor 610 in an exercise machine is used to determine the total work done 612 by an individual, and from this measurement an estimate is made 614 of the heating of the individual. The estimated heating 614 is compared 600 to an allowable maximum value 604, and if the estimated heating 614 exceeds 606 the allowable maximum value 604 mist is applied 608, followed by dry air 610. As with FIG. 6A, in similar embodiments other cooling strategies, such as those shown in FIG. 1B through 1G, are used. For example, mist and dry air are applied simultaneously, dry air is applied followed by mist, or mist and dry air are applied simultaneously and continuously but the total intensity and/or the relative amounts of mist and dry air are varied.

Figure 7A:
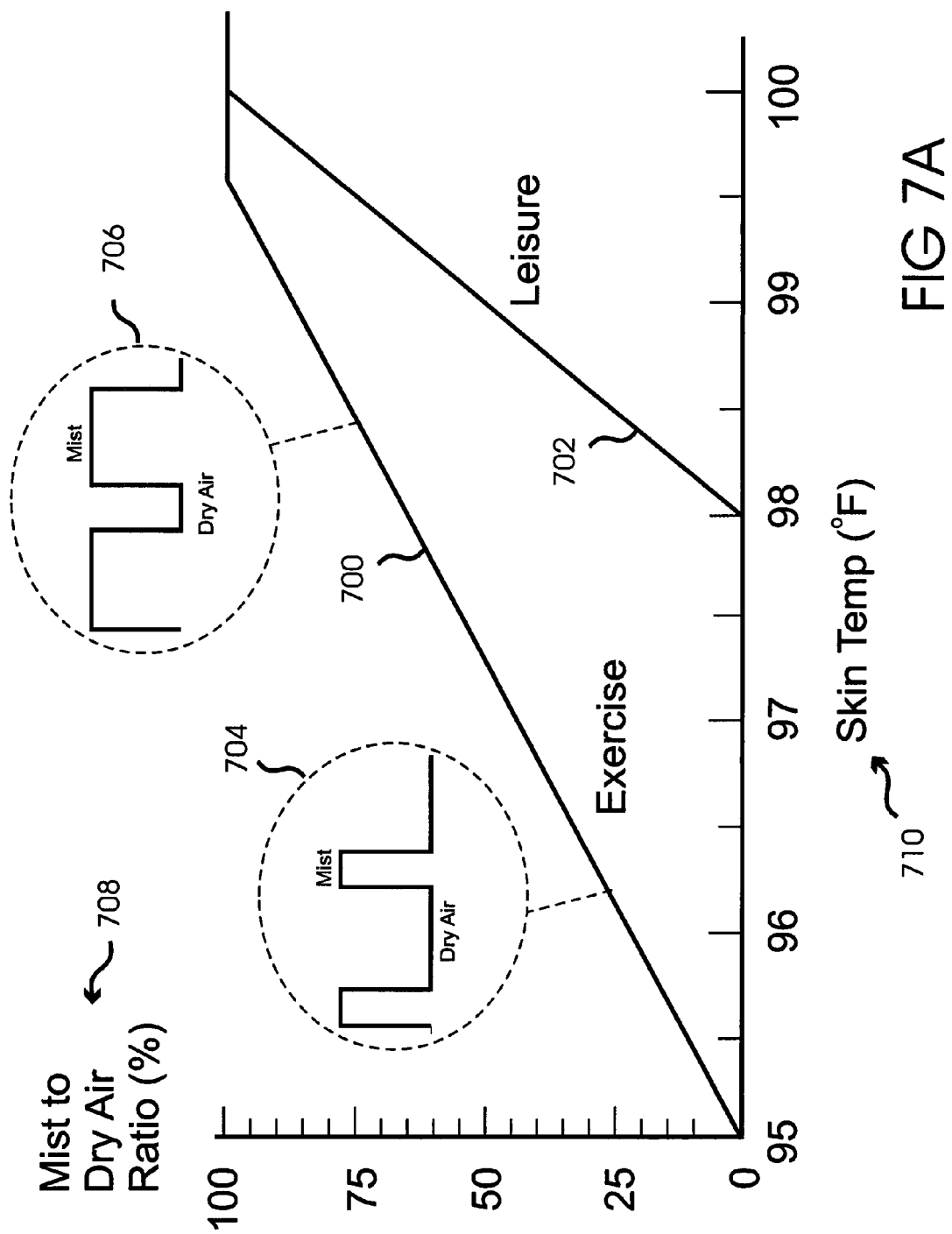
FIG. 7A is a graphical presentation of mist control strategies for exercising and resting individuals in preferred embodiments wherein the droplets are applied intermittently and wherein sensors are used to measure the skin temperatures of the individuals.

FIG. 7A is a graphical presentation of mist and dry air control strategies for exercising 700 and resting 702 individuals in preferred embodiments where the mist and dry air are applied alternately 704, 706 with a variable mist/dry air ratio 708. In each case, the mist/dry air ratio 708 is adjusted according to the measured skin temperature 710 of the individual, with the mist/dry air ratio 708 being increased linearly as the measured skin temperature 710 rises.

FIG. 7B is a graphical presentation of a mist control strategy for an exercising 700 individual in a preferred embodiment similar to FIG. 7A, except that the mist/dry air ratio 708 is increased linearly as the measured core body temperature 712 rises above a baseline temperature.

FIG. 7C is a graphical presentation of a mist and dry air control strategy for a resting individual 702 in a preferred embodiment wherein the density of water droplets in dry air 714 is varied 716, 718 until a point is reached 720 where no further changes of the density 714 are needed to maintain a desired skin temperature 722.

Figure 7D:
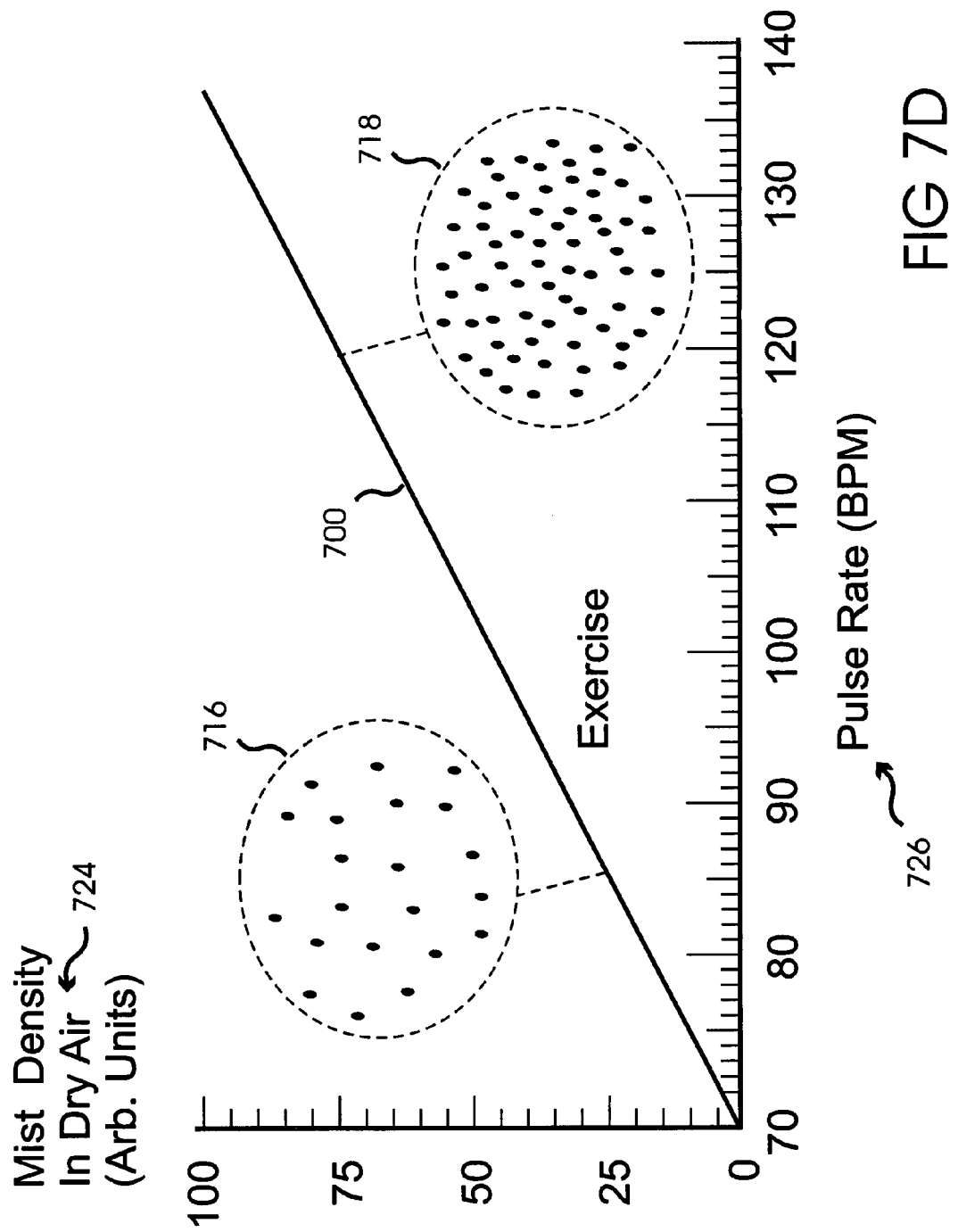
FIG. 7D is a graphical presentation of a mist control strategy wherein the density of the mist is varied according to a measured pulse rate of an exercising individual.

FIG. 7D is a graphical presentation of a mist control strategy for an exercising individual 700 wherein the density 724 of the water droplets in dry air is increased linearly as the measured pulse rate 726 of the individual rises.

Figure 7E:
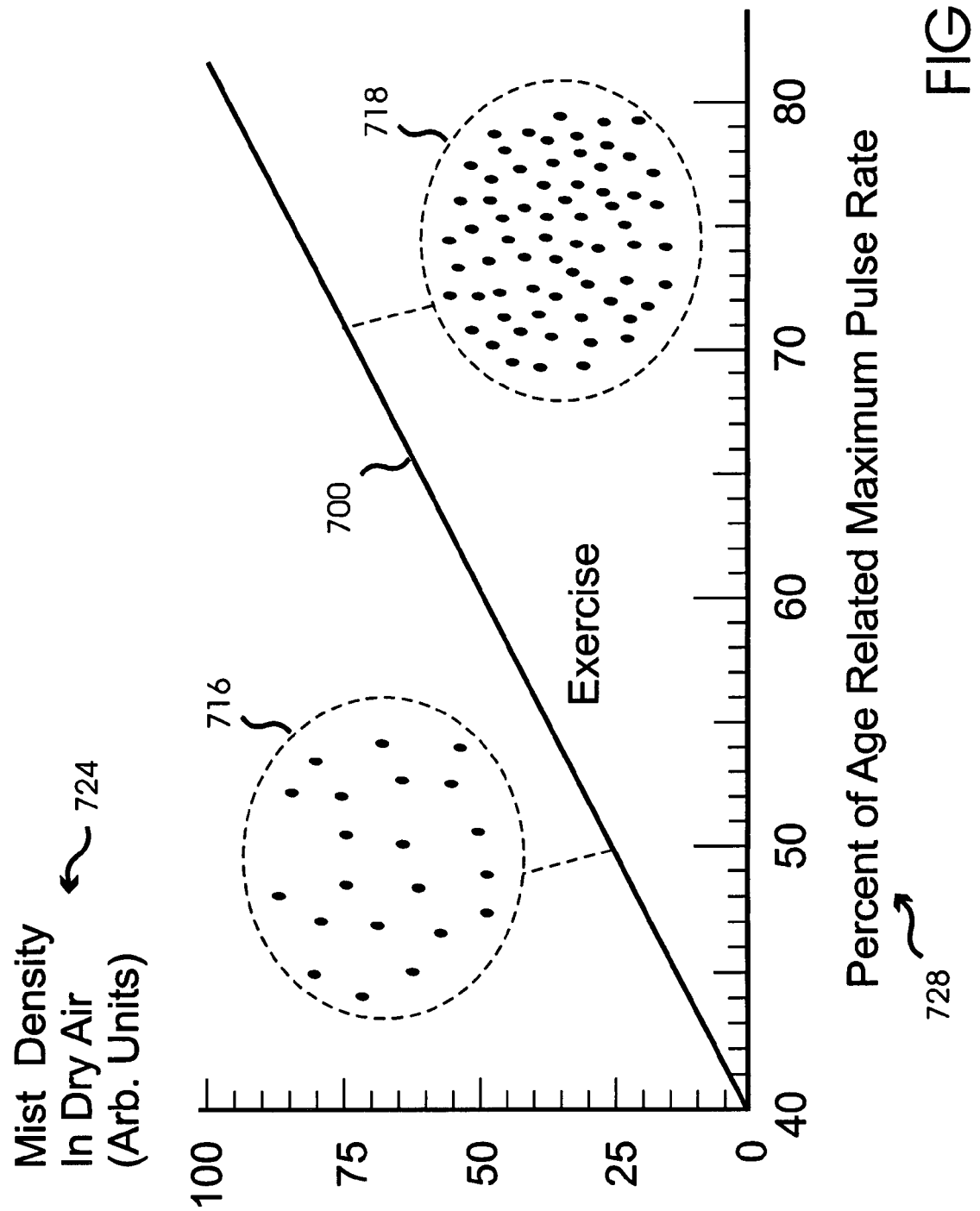
FIG. 7E is a graphical presentation of a mist control strategy wherein the density of the mist is varied according to the ratio of the measured pulse rate of an exercising individual to the age related maximum pulse rate for the individual.

FIG. 7E is similar to FIG. 7D, except that the density 724 of the water droplets is linearly increased as the measured heart rate approaches the age related maximum heart rate 728 for the individual.

Figure 8:
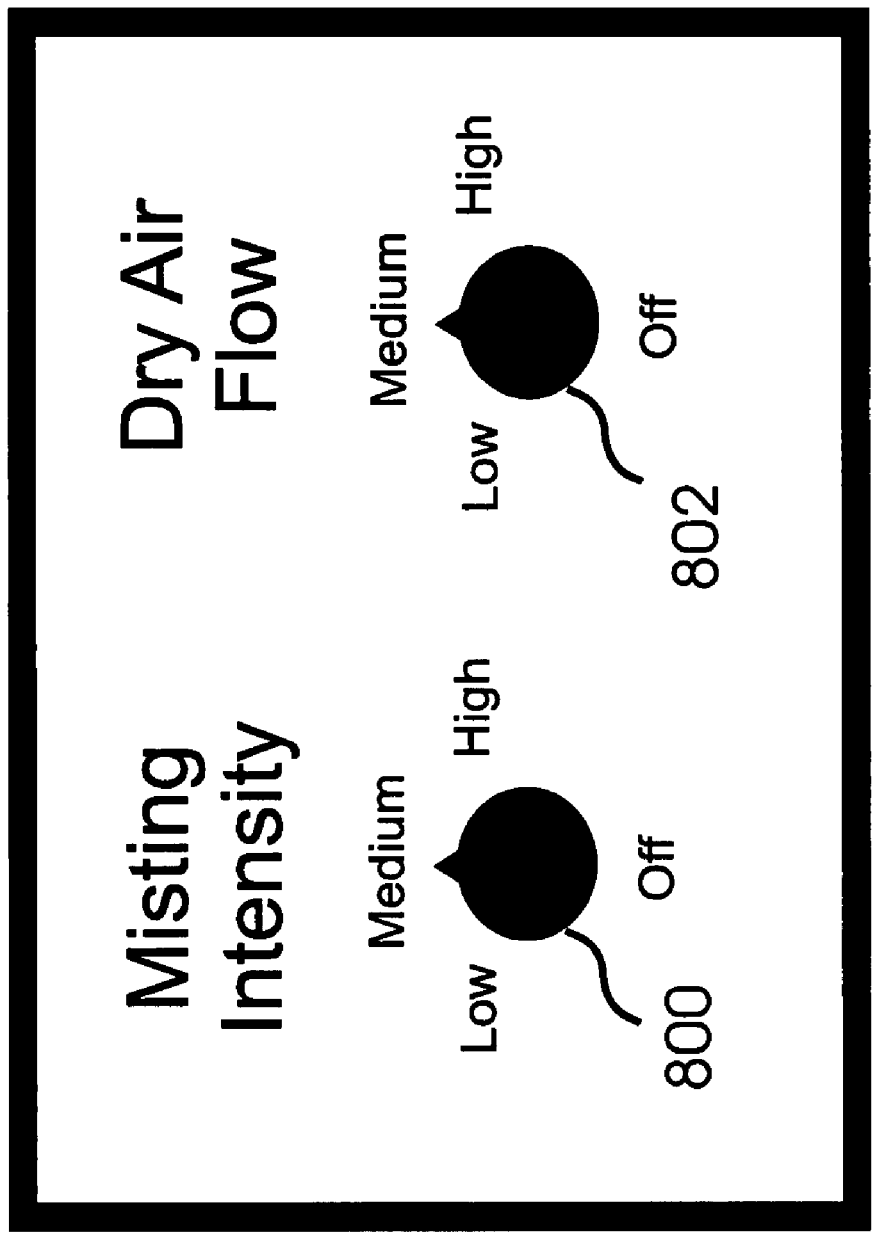
FIG. 8 is a front drawing of a control panel for a preferred embodiment wherein the user manually adjusts the desired level of misting intensity and dry air intensity.

FIG. 8 is a front drawing of a simple control panel for a preferred embodiment such as the embodiment of FIG. 2C wherein the user manually adjusts the desired level of misting intensity 800 and the dry air flow rate 802. In different embodiments the misting intensity 800 represents the on/off ratio of an intermittent flow, a water droplet density of a continuous flow, an average rate of droplet application, or any other factor or combination of factors that determine the overall rate at which droplets are applied to the individual. In this embodiment, the user selects from between four levels of intensity, labeled "High," "Medium," "Low," and "Off."

Figure 9:
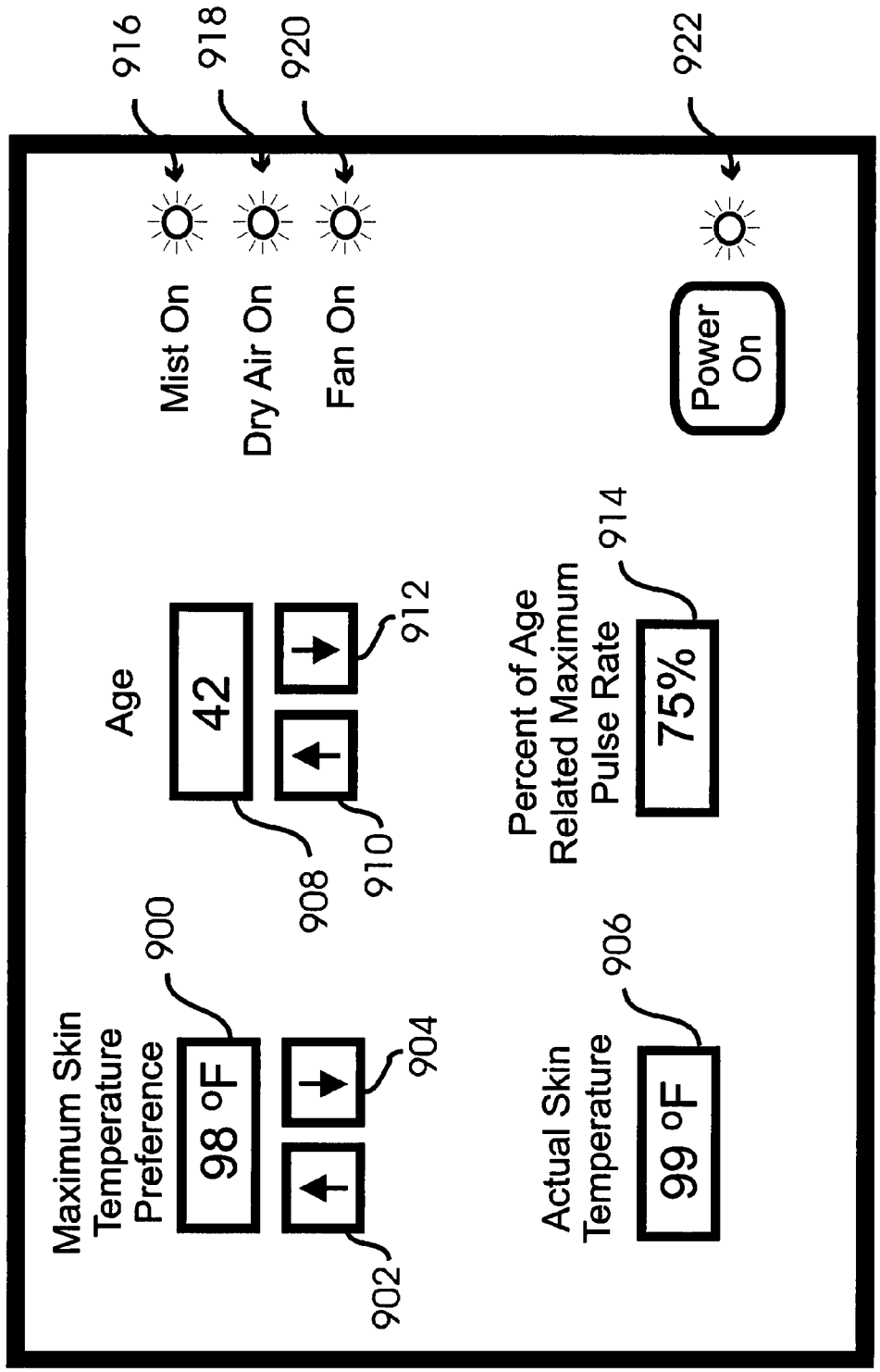
FIG. 9 is a front drawing of a control panel for a preferred embodiment wherein the apparatus is automatically controlled according to the measured skin temperature and percent of age-related maximum pulse rate of an individual, and wherein the apparatus controls the air flow and humidity of the air near the individual in addition to the application of mist.

FIG. 9 is a front drawing of a control panel for a preferred embodiment wherein the apparatus is automatically controlled according to the measured skin temperature and measured percent of age-related maximum pulse rate of an individual. A maximum skin temperature 900 is entered using pushbuttons 902, 904, and is compared to a measured skin temperature 906. Also, the individual's age 908 is entered using pushbuttons 910, 912, and is used to compute the age related maximum pulse rate of the individual. The individuals actual pulse rate is measured by a sensor, and is displayed 914 as a percent of the individual's age-related maximum pulse rate. If the actual skin temperature 906 rises above the user specified maximum preferred skin temperature 900, and/or if the percentage of age-related maximum heart rate 914 rises too high, then the controller applies a combination of mist 916, and dry air 918, according to a strategy such as one of the strategies shown in FIG. 1B through FIG. 1G. The controller also controls the rate of dry air flow past the individual by use of a controllable fan 920. A power indicating light 922 is also provided to indicate that the unit is switched on.

Other modifications and implementations will occur to those skilled in the art without departing from the spirit and the scope of the invention as claimed. Accordingly, the above description is not intended to limit the invention except as indicated in the following claims.

What is claimed is:

1. An apparatus for cooling at least one individual, comprising:
    at least one water droplet emission device capable of applying water droplets to the at least one individual; and
    a device for providing dry air near the at least one individual so as to promote the evaporation of the water droplets, the device for providing dry air including at least one of:
    at least one container of compressed dry air, and
    an electrically powered air-drying apparatus.

2. The apparatus of claim 1, wherein the water droplets applied by the at least one the water droplet emission device are at least one of:
    a mist of water; a spray of water; and a shower of water.

3. The apparatus of claim 1, wherein at least one of the water droplet emission devices is attached to an object used by one of the individuals.

4. The apparatus of claim 3, wherein the object used by one of the individuals is one of an exercise device and a resting device.

5. The apparatus of claim 1, wherein the device for providing dry air is able to direct a flow of dry air onto at least one individual.

6. The apparatus of claim 5, wherein the apparatus is able to alternate between applying water droplets to at least one individual and directing a flow of dry air onto the at least one individual.

7. The apparatus of claim 5, wherein the apparatus is able to inject water droplets into the flow of dry air so that the droplets are directed onto the at least one individual together with the dry air.

8. The apparatus of claim 7, wherein the apparatus is able to alternate between injecting water droplets into the flow of dry air and not injecting droplets into the flow of dry air.

9. The apparatus of claim 5 wherein the apparatus is able to control at least one of the speed and the direction of the flow of dry air.

10. The apparatus of claim 1, wherein the water droplet emission device is able to control at least one of:
    duration of emitting of water droplets;
    frequency of emitting of water droplets;
    rate of emission of water droplets;
    numerical density of emitted water droplets;
    size of emitted water droplets;
    temperature of emitted water droplets;
    initial direction of travel of emitted water droplets;
    initial speed of travel of emitted water droplets; and
    divergence of emitted water droplets.

11. The apparatus of claim 1, wherein the water droplet emission device is manually controlled.

12. The apparatus of claim 1, wherein the water droplet emission device is automatically controlled.

13. The apparatus of claim 12, wherein the water droplet emission device is automatically controlled at least according to the passage of time.

14. An apparatus for cooling at least one individual, comprising:
    at least one water droplet emission device capable of applying water droplets to the at least one individual, and configured to be automatically controlled at least according to a measured physiological parameter; and
    a device for providing dry air near the at least one individual so as to promote the evaporation of the water droplets.

15. The apparatus of claim 14, wherein the water droplet emission device is automatically controlled at least according to at least one of:
    the skin temperature of at least one of the individuals;
    the heart rate of at least one of the individuals;
    the core body temperature of at least one of the individuals; and
    the perspiration of at least one of the individuals.

16. The apparatus of claim 14, wherein a physiological parameter is measured by a sensor that is directed toward or attached to one of the individuals.

17. The apparatus of claim 14, wherein a physiological parameter is measured by a sensor embedded in an object used by one of the individuals.

18. The apparatus of claim 12, wherein the water droplet emission device is controlled at least according to the activity of an exercise machine used by the at least one individual.

19. The apparatus of claim 18, wherein the water droplet emission device is configured to be automatically controlled by the apparatus at least according to one of the rate of energy expended on the exercise machine and the cumulative amount of energy expended on the exercise machine.

20. An apparatus for cooling at least one individual, comprising:
    at least one water droplet emission device capable of applying water droplets to the at least one individual;
    a device for providing dry air near the at least one individual so as to promote the evaporation of the water droplets; and
    an airborne droplet detection device that is able to detect and limit the presence of airborne droplets in a volume of space.

21. A method for cooling an individual, comprising applying water droplets to an individual in coordination with providing dry air at least near the individual, so as to promote the evaporation of the water droplets,
    wherein the dry air is provided by at least one of:
    supplying the dry air from one or more containers of compressed dry air, and
    drying the air to be provided using an electrically powered air-drying apparatus.

22. The method of claim 21, further comprising providing an apparatus for cooling an individual, the apparatus including at least one water droplet emission device capable of applying water droplets to the at least one individual and a device for providing dry air near the at least one individual so as to promote the evaporation of the water droplets.

23. The method of claim 21, wherein providing dry air at least near the individual includes directing a flow of dry air onto the individual.

24. A method for cooling an individual, comprising:

applying water droplets to the individual in an enclosed environment containing dry air, so as to take advantage of dry air properties that enhance evaporation of water droplets and thereby increase evaporative cooling efficiency; and maintaining the dryness of the dry air in the enclosed environment by at least one of dehumidification and air conditioning.

* * * * *